(12) United States Patent
Eichel

(10) Patent No.: US 6,459,435 B1
(45) Date of Patent: Oct. 1, 2002

(54) METHODS, SYSTEMS AND COMPUTER PROGRAM PRODUCTS FOR GENERATING STORYBOARDS OF INTERIOR DESIGN SURFACE TREATMENTS FOR INTERIOR SPACES

(75) Inventor: Lauranne P. Eichel, Chapel Hill, NC (US)

(73) Assignee: BlueBolt Networks, Inc., Durham, NC (US)

( * ) Notice: Subject to any disclaimer, the term of this patent is extended or adjusted under 35 U.S.C. 154(b) by 0 days.

(21) Appl. No.: 09/481,297

(22) Filed: Jan. 11, 2000

(51) Int. Cl.⁷ .............................................. G06T 11/40
(52) U.S. Cl. ...................................................... 345/588
(58) Field of Search ................................. 345/581, 582, 345/588, 589; 382/111, 162, 164, 165; 700/130, 131, 135; 703/1; 705/26, 27

(56) References Cited

U.S. PATENT DOCUMENTS

| | | | |
|---|---|---|---|
| 5,827,430 A | 10/1998 | Perry, Jr. et al. | 210/497.01 |
| 5,833,790 A | 11/1998 | Hare | 156/240 |
| 5,846,265 A | 12/1998 | McGregory et al. | 8/400 |
| 5,870,771 A | 2/1999 | Oberg | 707/502 |
| 5,893,956 A | 4/1999 | Perry, Jr. et al. | 156/167 |
| 5,933,578 A | 8/1999 | Van de Capelle et al. | 395/109 |
| 5,966,454 A | 10/1999 | Thomas et al. | 382/111 |
| 5,982,924 A | 11/1999 | Power et al. | 382/162 |
| 6,005,969 A | 12/1999 | Thomas et al. | 382/162 |

OTHER PUBLICATIONS

Mona, The textile Design Explorer, User's Manual, d cube Tm, Cone Mills Corporation, 1996, p. 1–5&8–16 (item 18 of IDS).*

Mona™ The Textile Design Explorer, User' Manual, d cube™ Cone Mills Corporation, 1996, p. 1–5 & 8–16.

Data Sheet, Oracle 8i Visual Information Retrieval, Oracle, Mar. 1999, 8 pp.

Home Page, www.homeportfolio.com, Jan. 11, 2000.

Creativepro.com, Extensis PhotoTools 3.0, www.extensis.com, Jan. 11, 2000.

Graphic Detail, Inc., Thumbs Up™, www.graphicdetail.com, Jan. 11, 2000.

* cited by examiner

*Primary Examiner*—Jeffrey Brier
*Assistant Examiner*—G. F. Cunningham
(74) *Attorney, Agent, or Firm*—Myers Bigel Sibley & Sajovec

(57) ABSTRACT

A storyboard of interior design surface treatments for a commercial and/or residential interior space is generated by obtaining arrays of patterns that correspond to user search criteria, from a stored set of patterns for interior design surface treatments. The arrays of patterns are displayed on a computer display. Each array of patterns corresponds to a surface treatment product type. Subarrays of patterns then are generated, each subarray corresponding to a surface treatment product type. The subarrays of patterns are generated in response to selection by a user from the corresponding array of patterns for the corresponding surface treatment type. Finally, at least one pattern from at least two of the subarrays of patterns are combined to produce a storyboard of interior design surface treatments for an interior space.

122 Claims, 31 Drawing Sheets

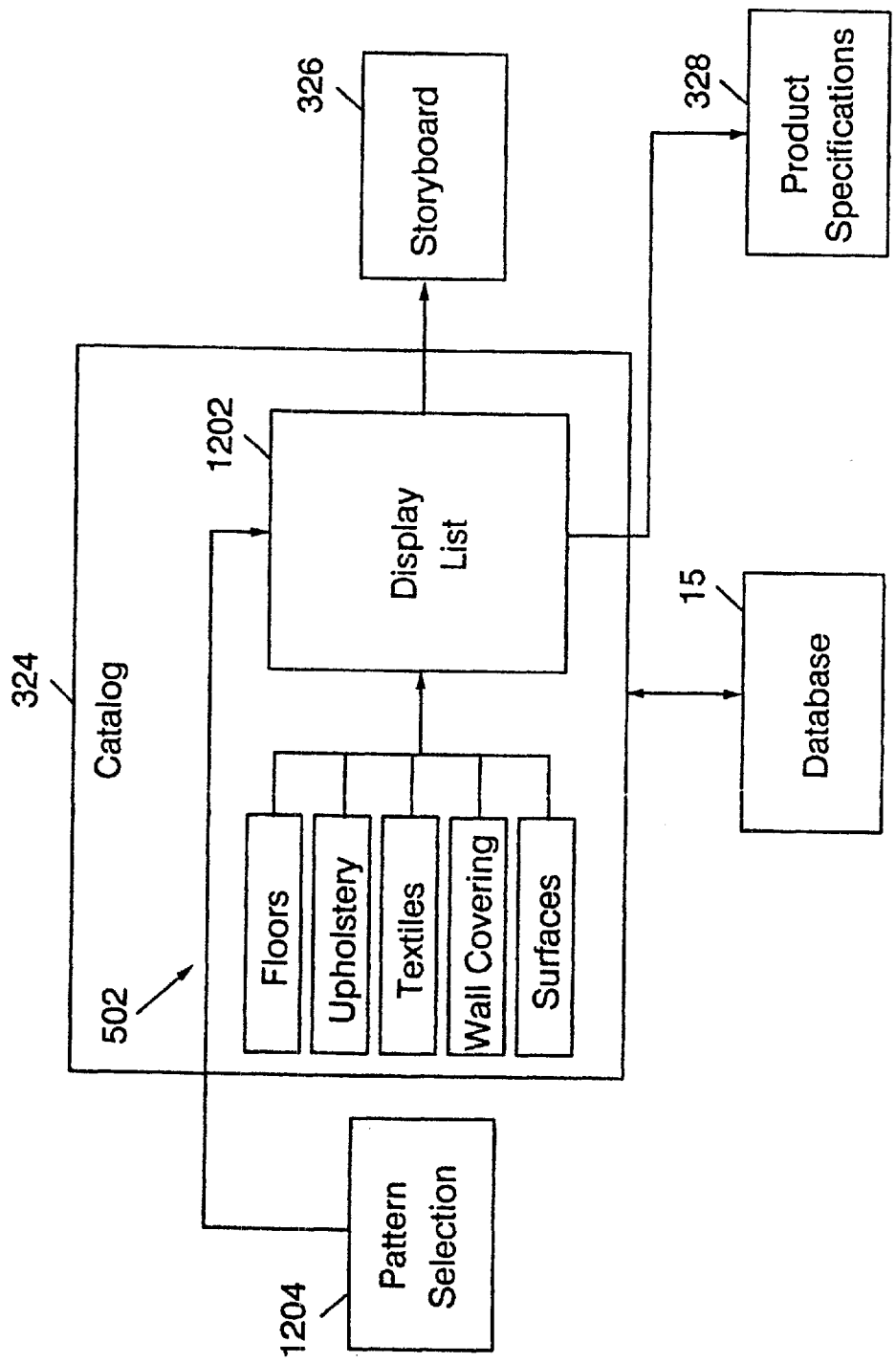

METHODS, SYSTEMS AND COMPUTER PROGRAM PRODUCTS FOR GENERATING STORYBOARDS OF INTERIOR DESIGN SURFACE TREATMENTS FOR INTERIOR SPACES

FIELD OF THE INVENTION

This invention relates to computer systems, methods and computer program products, and more particularly to graphical computer systems, methods and computer program products.

BACKGROUND OF THE INVENTION

Interior decorators/designers assist clients in selecting and coordinating interior design surface treatments, also referred to as surface coverings, including floor treatments, upholstery, fabrics, wall treatments and/or countertop surfaces for commercial and/or residential interior spaces. These interior design surface treatments are selected from many manufacturers, each of which generally produces many different patterns and color schemes of floor treatments, upholstery, fabrics, wall treatments and/or surfaces. These interior design surface treatments generally are coordinated from an aesthetic, functional and/or budgetary standpoint.

In order to select interior design surface treatments for an interior space, an interior designer generally views the interior space, plans and/or photographs thereof, including any existing interior design surface treatments. The designer's client also is consulted as to the functional, aesthetic and/or budgetary requirements.

The interior designer then scans many sample books of floor treatments, upholstery, fabrics, wall treatments, surfaces and/or other interior design surface treatments. In general, each manufacturer will produce many sample books. Thus, for example, for wallpaper, each of dozens or more of manufacturers may produce dozens or more of sample books of wallpaper patterns.

After scanning these books, a small number of patterns that are thought to be appropriate for the interior space are selected. The books that include these patterns then may be lugged to the interior space and/or to the client for review and/or discussion. Alternatively, a sample of each interior design surface treatment that is being considered may be cut from the sample book or ordered from the manufacturer.

After additional client consultation, the samples may be narrowed down to one sample for each product that is being used. A sample of each product type that will be used in the interior space may be mounted on a foam-backed or other board, known as a "storyboard", so that the client can view each of the proposed interior design surface treatments, and the manner in which they coordinate in the particular interior space. Multiple storyboards may be generated for a given interior space.

Although the interior design process has been described above as a linear process, it will be understood that the process generally is iterative with multiple iterations at each step and multiple returns to earlier steps based on the client's decision, budgetary constraints and/or other factors. This process may be time consuming and inefficient.

It will be recognized that the above-described interior design process involves the selection and coordination of patterns of interior design surface treatments for aesthetic, functional and/or budgetary compatibility. Graphical computers now have been developed that can manipulate graphical images such as patterns of interior design surface treatments. In fact, personal computers generally include Graphical User Interfaces (GUI) that can manipulate graphical images.

Graphical computer systems have been applied to manipulate images of interior design surface treatments. For example, U.S. Pat. Nos. 5,966,454 and 6,005,969, both to Thomas et al. and both entitled Methods and Systems for Manipulation of Images of Floor Coverings or Other Fabrics, provide methods and systems that enable a highly streamlined and efficient fabric or textile sampling and design process, particularly valuable in the design and selection of floor treatments, wall treatments and other interior design treatments. A digital library of fabric models is created, preferably including digitized full-color images and having associated a digital association of positions that are located within and which characterize the models. Via an application implemented according to conventional software methods, and running on conventional hardware having high resolution graphics processing capabilities, a user may navigate among a set of alternative models and may modify the positions of the selected models, to test out desired combinations of characteristics-such as poms, or yard-ends, for models of floor treatments-and view the results in high resolution. The resulting samples or designs can be stored and transmitted over a telecommunications network, or by other means, to a central facility that can either generate photographic-quality images of the samples, or can directly generate actual samples of carpet or other material of interest. See the '454 and '969 patent abstracts.

Another example of a graphical computer system that has been applied to manipulate images of interior design surface treatments is the MONA™ Textile Design Explorer, developed by Cone Mills Corporation's Business Unit d cube™. MONA lets a user quickly and precisely browse through a rich database of images. When the user finds a pattern of interest, the user can execute a search based on that image and the software gathers other patterns that are similar in style, motif or other visual characteristics. If the user knows exactly what the user wants, the user can conduct a more structured search using a unique textile design terminology system that allows for powerful cross-referencing options. Once selections have been made, high resolution images can be downloaded to edit, combine or recolor with off-the-shelf or CAD/CAM software. The MONA Textile Design Explorer is described in a *User's Manual*, 1996.

Manipulation of graphical images on computer systems also has been applied in other industries. See, for example, U.S. Pat. No. 5,870,771 to Oberg, entitled Computerized System for Selecting, Adjusting, and Previewing Framing Product Combinations for Artwork and Other Items to be Framed. Disclosed is a computerized system having means for displaying a digital image with an object, such as an object of artwork supplied by a user, analyzing the color composition of the image, searching a database for coordinating frame and matting material products, developing composite images of the user's input with the matching selections and presenting the digital images to the user, so that the items may be previewed before placing an order. See the '771 patent abstract.

Another example is the Web site for HomePortfolio, Inc. This Web site presents an editorial selection of top-of-the-line and hard-to-find home design products and directs the user to their nearest retailer. HomePortfolio lets a user choose favorite products and organize them in the user's own personal portfolio-an online scrapbook that makes it easy to communicate with a spouse, builder, architect or designer. See www.homeportfolio.com.

Notwithstanding these and other advances in computer graphic systems, the interior design process generally continues to use large numbers of product sample books, ordering of samples and creating storyboards on foam-backed cardboard, as was described above. As was described above, this process may be time-consuming and inefficient.

SUMMARY OF THE INVENTION

The present invention can provide computerized methods, systems and/or computer program products for generating a storyboard of interior design surface treatments for a commercial and/or residential interior space. A plurality of arrays of patterns that correspond to user search criteria are obtained from a stored set of patterns for interior design surface treatments, and are displayed on a computer display. Each array of patterns corresponds to a surface treatment product type, such as floor treatments, upholstery, textiles (fabrics), wall treatments and surfaces (countertops). The product type also can include product subtypes, such as carpet, vinyl composition tile, resilient sheet flooring, porcelain tile and ceramic tile for floor treatments.

A plurality of subarrays of patterns then are generated, each subarray corresponding to a surface treatment product type. The plurality of subarrays of patterns are generated in response to selection by a user, generally an interior designer/decorator, architect, facility planner, product dealer and/or general contractor, from the corresponding array of patterns for the corresponding surface treatment type. Finally, at least one pattern from at least two of the subarrays of patterns are combined to produce a storyboard of interior design surface treatments for an interior space.

By displaying the arrays of patterns that correspond to user search criteria, allowing selection from these patterns to generate a plurality of subarrays of patterns, and allowing at least one pattern from at least two of the subarrays to be combined to produce a storyboard on a computer system, large numbers of patterns may be considered and combined without the need to peruse a large library of sample books. Moreover, the one or more storyboards may be generated without the need to physically order samples or cut samples from sample books. The subarrays of patterns that are under consideration and/or one or more storyboards, may be viewed on a computer system, and may be emailed to a client to allow improved efficiency in the decision-making process. More sophisticated interior design also may be obtained, by considering large numbers of patterns for each product type, while allowing streamlined client interaction and allowing the time for the interior design process to be reduced.

Prior to displaying a plurality of arrays of patterns that correspond to user search criteria from a stored set of patterns for interior design surface treatments, a set of patterns for interior design surface treatments preferably is stored. Each pattern preferably includes a plurality of pattern attributes associated therewith. The pattern attributes may include a product specification including an identification of a manufacturer, an identification of a primary color, and an identification of an overall style. However, other attributes may be added over those that are provided by the manufacturer, including design movement, motif, color quality and/or technique. The associated plurality of pattern attributes is stored on a computer system. In order to display a plurality of arrays of patterns that correspond to user search criteria, at least one user-selected attribute is accepted for at least one of the surface product treatment types, to define the user search criteria. The stored pattern attributes and the patterns themselves may be searched for the at least one of the surface treatment product types, to generate the plurality of arrays of patterns that meet the user search criteria.

Generally, multiple search criteria are used by a designer for each product type. Moreover, patterns preferably are retrieved that meet any of the search criteria. In order to provide an indication of the extent that the pattern matches the user search criteria, an indicator also may be displayed with each pattern that indicates an extent that the pattern matches the user search criteria. For example, a bar may be displayed adjacent each pattern with the length of the bar indicating the extent that the particular pattern meets the user's search criteria.

The plurality of arrays of patterns that correspond to the user's search criteria may be displayed in an array or matrix, for example a 6×6 matrix containing 36 patterns that meet the user search criteria. Larger or smaller arrays may be displayed and large arrays may be displayed using tabs. The designer then may select from the displayed arrays of patterns to identify a subarray of patterns for a particular product type. The subarray may include one or more patterns that are selected by the designer as being of interest. The subarrays that are selected may be highlighted in the arrays of patterns. However, preferably, the subarrays are separately displayed to create a "catalog" of fabrics that are being considered for each product type. The catalog may be reviewed with a client, for example by email.

At least one pattern from at least two of the subarrays of patterns is combined to produce the storyboard. The storyboard preferably is displayed on the computer display. The storyboard may be annotated by the interior designer, for example using an editing tool, to indicate, for example, which pattern is being considered for wall treatment, which pattern is being considered for floor treatment, which pattern is being considered for upholstery and which pattern is being considered for countertops. The storyboard then may be emailed to the client. The storyboard also may be electronically stored and/or printed. The storyboard also may be used to electronically order samples of the interior design surface treatments that are contained in the storyboard. In yet another alternative, the storyboard may be used to electronically order sufficient quantities of the interior design surface treatments that are contained in the storyboard, for the interior space.

The present invention preferably is implemented using a graphical user interface. In such a graphical user interface, the plurality of arrays of patterns preferably is displayed in a first window on a display and the plurality of subarrays of patterns preferably is displayed in a second window on the display. The storyboard preferably is displayed in a third window on the display. These windows may be contiguous or separated from one another and may be accessed using tabs, pull-down menus or other conventional window selection techniques.

Moreover, the present invention preferably is implemented in a client-server environment. Preferably, a client computer and a server computer are connected via a network, preferably the Internet. More specifically, the stored set of patterns for interior design surface treatments may consume large amounts of computer storage, and a high speed search engine preferably is used for searching the stored set of patterns. Accordingly, the set of patterns for interior design surface treatments may be stored at a server system, preferably a Web server, and the search engine for searching the stored set of patterns also may operate at a server system. The user search criteria may be generated at a client system, for example a desktop, laptop or palmtop personal computer, and may be conveyed to the server system over the Internet. The array of patterns that are generated from the search may be transmitted to the client system over the network, such as the Internet, and displayed at the client system. The subarrays may be generated at the client system and the storyboard also may be generated at the client system. After the storyboard is generated, however, the storyboard preferably is transmitted to the client system for storage until needed again.

The invention has been described above in terms of displaying a plurality of arrays of patterns that correspond to user search criteria, generating a plurality of subarrays of patterns in response to user selection from the corresponding array of patterns and combining at least one pattern to produce the storyboard. However, the storyboard may be generated directly from the plurality of arrays of patterns without the need for intermediate generation of a plurality of subarrays of patterns. Accordingly, a plurality of arrays of patterns that correspond to user search criteria may be obtained from a stored set of patterns for interior design surface treatments and may be displayed. Then, at least one pattern from at least two of the arrays of patterns may be combined to produce a storyboard.

In client-server implementations of the present invention, the server preferably stores the set of patterns for a plurality of surface treatment product types, each pattern including a plurality of pattern attributes. The server preferably accepts from a client over a network such as the Internet, at least one user-selected attribute for at least one of the surface treatment product types. The stored pattern attributes for the at least one of the surface treatment product types is searched to generate a plurality of arrays of patterns that meet the at least one user-selected attribute. The plurality of arrays of patterns that meet the at least one user-selected attribute preferably is transmitted to the client over the network. A storyboard of interior design surface treatments for an interior space preferably is received from the client over the network and is stored at the server.

The client preferably accepts at least one user-selected attribute for at least one of a plurality of surface treatment product types, to define user search criteria. The user search criteria preferably is transmitted to the server over the network. The client also preferably receives from the server over the network, a plurality of arrays of patterns that correspond to the user search criteria, each array of patterns corresponding to a surface treatment product type. The plurality of arrays of patterns preferably is displayed. The client accepts at least one user selection from at least one of the plurality of arrays of patterns. The client preferably generates a plurality of subarrays of patterns and preferably displays the plurality of subarrays of patterns. The client then preferably combines at least one pattern from at least two of the subarrays, to produce a storyboard, and preferably displays the storyboard. Accordingly, the interior design process may be made more flexible and/or more efficient.

BRIEF DESCRIPTION OF THE DRAWINGS

FIG. 12 is a block diagram of a catalog according to an embodiment of the present invention.

DETAILED DESCRIPTION OF PREFERRED EMBODIMENTS

Figure 1:
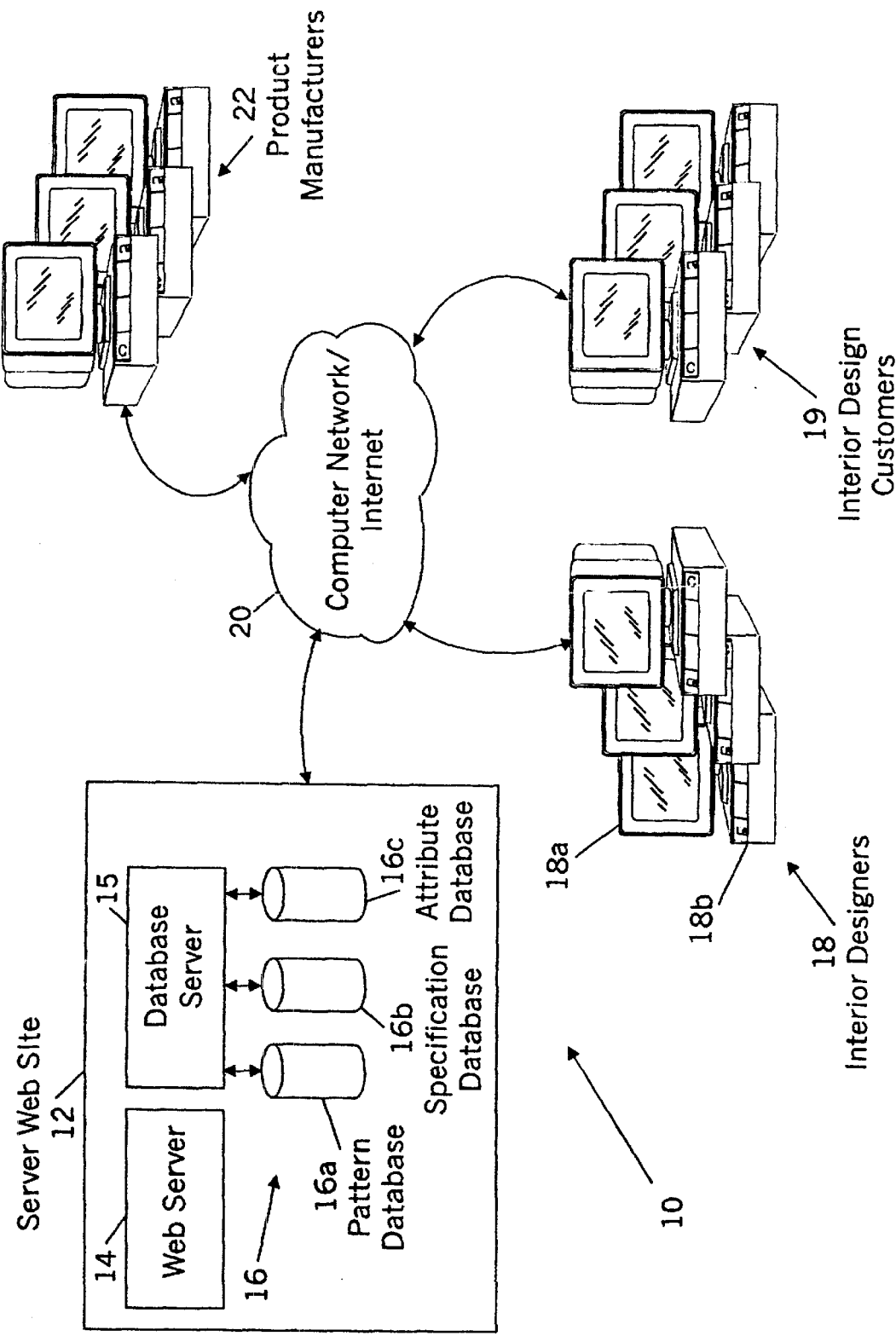
FIG. 1 is a diagrammatic representation of computer systems, methods and computer program products for generating a storyboard of interior design surface treatments for an interior space according to an embodiment of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

In order to provide a complete description of preferred embodiments of the invention in a systematic manner, a general description first will be provided. An intermediate level description then will be provided, followed by a detailed implementation of preferred embodiments.

General Description

The present invention may be practiced on a single computer, preferably using a client-server architecture. However, because the present invention preferably involves storage and/or searching of large numbers of graphical images (patterns) of interior design surface treatments, the present invention preferably is implemented on a client-server system, wherein at least one client computer and at least one server computer is connected over a network, such as the Internet.

The Internet is a worldwide decentralized network of computers having the ability to communicate with each other. The Internet has gained broad recognition as a viable medium for communicating and for conducting business. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and Web pages are the prevalent forms for the Web, the Web itself refers to a wide range of protocols including Secure Hypertext Transfer Protocol (HTTPS), File Transfer Protocol (FTP), and Gopher, and Web content formats including plain text, HyperText Markup Language (HTML), Extensible Markup Language (XML), as well as image formats such as Graphics Interchange Format (GIF) and Joint Photographic Experts Group (JPEG).

A Web site is conventionally a related collection of Web files that includes a beginning file called a "home" page. From the home page, a visitor can access other files and applications at a Web site. A large Web site may utilize a number of servers, which may or may not be different and which may or may not be geographically-dispersed. For example, the Web site of the International Business Machines Corporation (www.ibm.com) includes thousands of Web pages and files spread out over multiple Web servers in locations world-wide.

A Web server (also referred to as an HTTP server) is a computer program that generally utilizes HTTP to serve files that form Web pages to requesting Web clients. Exemplary Web servers include International Business Machines Corporation's family of Lotus Domino® servers, the Apache server (available from www.apache.org), and Microsoft's Internet Information Server (IIS), available from Microsoft Corporation, Redmond, Wash. A Web client is a requesting program that also generally utilizes HTTP. A browser is an exemplary Web client for use in requesting Web pages and files from Web servers. A Web server waits for a Web client, such as a browser, to open a connection and to request a specific Web page or application. The Web server then sends a copy of the requested item to the Web client, closes the connection with the Web client, and waits for the next connection.

HTTP allows a browser to request a specific item, which a Web server then returns and the browser renders. To ensure that browsers and Web servers can interoperate unambiguously, HTTP defines the exact format of requests (HTTP requests) sent from a browser to a Web server as well as the format of responses (HTTP responses) that a Web server returns to a browser. Exemplary browsers that can be utilized with the present invention include, but are not limited to, Netscape Navigator® (America Online, Inc., Dulles, Va.) and Internet Explorer™ (Microsoft Corporation, Redmond, Wash.). Browsers typically provide a graphical user interface for retrieving and viewing Web pages, applications, and other resources served by Web servers.

As is known to those skilled in this art, a Web page is conventionally formatted via a standard page description language such as HTML, which typically contains text and can reference graphics, sound, animation, and video data. HTML provides for basic document formatting and allows a Web content provider to specify anchors or hypertext links (typically manifested as highlighted text) to other servers. When a user selects a particular hypertext link, a browser running on the user's client device reads and interprets an address, called a Uniform Resource Locator (URL) associated with the link, connects the browser with a Web server at that address, and makes a request (e.g., an HTTP request) for the file identified in the link. The Web server then sends the requested file to the client device which the browser interprets and renders within a display screen.

As also will be appreciated by one of skill in the art, the present invention may be embodied as methods, data processing systems, and/or computer program products. Accordingly, the present invention may take the form of an entirely hardware embodiment, an entirely software embodiment running on general purpose hardware or an embodiment combining software and hardware aspects. Furthermore, the present invention may take the form of a computer program product on a computer-usable storage medium having computer-usable program code embodied in the medium. Any suitable computer readable medium may be utilized including hard disks, CD-ROMs, optical storage devices, or magnetic storage devices.

Computer program code for carrying out operations of the present invention may be written in an object oriented programming language such as JAVA®, Smalltalk or C++. The computer program code for carrying out operations of the present invention may also be written in conventional procedural programming languages, such as "C", JavaScript, Visual Basic, TSQL, Perl, or in a functional (or fourth generation) programming language such as Lisp, SML, or Forth. In addition, Microsoft Active Server Pages (ASP) technology and Java Server Pages (JSP) technology may be utilized. The program code may execute entirely on one or more Web servers and/or application servers, or it may execute partly on one or more Web servers and/or application servers and partly on a remote computer (i.e., a user's Web client), or as a proxy server at an intermediate point in the network. In the latter scenario, the remote computer may be connected to the Web server through a LAN or a WAN (e.g., an intranet), or the connection may be made through the Internet (e.g., via an Internet Service Provider).

The present invention is described below with reference to block diagram and flowchart illustrations of methods, apparatus (systems) and computer program products according to an embodiment of the invention. It will be understood that each block of the block diagrams and/or flowchart illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create structures for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process or method such that the instructions which execute on the computer or other programmable apparatus provide steps for implementing the functions specified in the block diagram and/or flowchart block or blocks.

Referring now to FIG. 1, a computer system 10 that can practice methods and/or include computer program products for generating a storyboard of interior design surface treatments for an interior space, according to an embodiment of the present invention, is schematically illustrated. The illustrated system 10 includes a server Web site 12 and a plurality of interior designer clients 18, also referred to as an interior designer site, an interior designer system or simply as an interior designer, that communicate with one another over a computer network, such as the Internet 20. Each interior designer site 18 includes a computer display 18a and a computer 18b. A pointing device such as a mouse also is included.

The server Web site 12 includes a Web server 14, such as a Java Web server, a database server 15 and one or more databases 16. As shown in FIG. 1, the databases 16 may include a pattern database 16a, a specification database 16b and an attribute database 16c. Other databases also may be provided. Although a single Web server 14 and database server 15 are illustrated, it will be understood that multiple Web servers and multiple database servers (including other application servers) may be utilized according to the present invention.

The Web server 14 is the "front end" component of the Web site 12, and is configured to handle requests from interior designers 18 that access the Web site 12. The Web server 14 can include program code, logic and graphics, to interface with the interior designers 18. Exemplary commercial Web servers that may be utilized as a Web server 14 in the illustrated system 10 are Apache, available from the Apache Server Project, http://www.apache.org; Microsoft's Internet Information Server (IIS), available from Microsoft Corporation, Redmond, Washington; and Netscape's Fast-Track® and Enterprise™ servers, available from America Online, Inc., Dulles, Va. Other Web servers that may be utilized include Novell's Web Server for users of its Net-Ware® operating system, available from Novell, Inc., San Jose, Calif.; and IBM's family of Lotus Domino® servers, available from International Business Machines Corporation, Armonk, N.Y.

As is known by those of skill in the art, a database is a collection of data that is organized in tables or other conventional forms of organization. A database typically includes a database manager and/or database server 15 that facilitates accessing, managing, and updating data within the various tables of a database. Exemplary types of databases that can be used to implement the pattern database 16a, specification database 16b, and attribute database 16c of the present invention include relational databases, distributed databases (databases that are dispersed or replicated among different points in a network), and object-oriented databases. Relational, distributed, and object-oriented databases are well understood by those of skill in the art and need not be discussed further herein. Since the present invention preferably includes large quantities of stored patterns, a database system that is particularly adapted for storing and searching large numbers of patterns, such as Oracle8i Visual Image Retrieval (VIR) available from Oracle Corp., Redwood Shores, Calif. may be used. See the Oracle8i Visual Information Retrieval Data Sheet, March 1999. However, other databases may be used, including IBM's DB2® database, Microsoft's SQL server database, and database products from Sybase and Computer Associates.

The database server 15 is an application server that operates as a "middleman" server between the Web server 14 and the plurality of databases 16. The database server 15 generally includes program code and logic for retrieving data from the databases 16 (and from sources external to the Web site 12) in response to requests from the Web server 14. The database server preferably is adapted for searching and storing of large numbers of patterns, such as Oracle VIR. Other commercial database servers that may be utilized as a database server 14 in the illustrated system 10 include Microsoft's SQL server, IBM DB2® Universal Database server, and the WebSphere™ Net.Commerce server, the latter two being available from International Business Machines Corporation, Armonk, N.Y.

FIG. 1 illustrates a plurality of databases including a pattern database 16a, a specification database 16b and an attribute database 16c. However, it will be understood that one or more of these databases may be combined into a single database and that other databases also may be provided at the server Web site 12. The pattern database 16a stores a plurality of patterns for interior design surface treatments. These patterns may be obtained from product manufacturers 22 via the computer network 20. The specification database 16b may include product specifications for each of the products that are stored at the server 15, and also may be obtained from product manufacturers 22. Attribute database 16c may include other attributes of products that supplement the product specifications. These attributes may be obtained from the product manufacturers 22 and/or may be generated by interior designers that operate the server Web site 12. Detailed examples will be provided below. The patterns for the pattern database 16a, the specifications for the specification database 16b and the attributes for the attribute database 16c may be stored, organized and/or manipulated using conventional cataloging software, such as Extensis PhotoTools 3.0, marketed by the Extensis Products Group of Creativepro.com, Inc. See www.extensis.com. Other software such as Thumbs Up™ marketed by Graphic Detail, Inc. may be used. See www.graphicdetail.com.

The server Web site 12 is accessible to interior designers 18 via a computer network such as the Internet 20. Interior designers 18 can access the server Web site 12 via a client program, such as a browser, running on a client device, such as a personal computer 18b including a display 18a. However, it is understood that electronic devices such as personal digital assistants (PDAs), hand-held computers, Internet-ready phones, and WebTVs, may be utilized as client devices for accessing the Web site 12 in accordance with the present invention.

The Web server 14 also is configured to communicate with various third parties in order to carry out aspects of the present invention. As will be described below, the Web server 14 is configured to communicate with the product manufacturers 22, in order to obtain the pattern database 16a, the specification database 16b and/or the attribute database 16c from each manufacturer. Moreover, samples of patterns in a storyboard may be ordered from the product manufacturers 22 via the Web server 14. In yet another alternative, actual quantities of the interior design surface treatments for the interior space may be ordered from the product manufacturers 22 via the Web server 14. Finally, the interior designers 18 may communicate with their interior design customers (referred to by interior designers as "clients") 19, for example by sending an email storyboard, via the Internet and preferably through the Web server 14. Communications between the interior designers 18, interior design customers 19, server Web site 12 and product manufacturers 22 are preferably established via the Internet 20. However, other communication methods and networks may be utilized, including direct-dial access and telephonic communications. Wireless or wire communications may be used.

Figure 2:
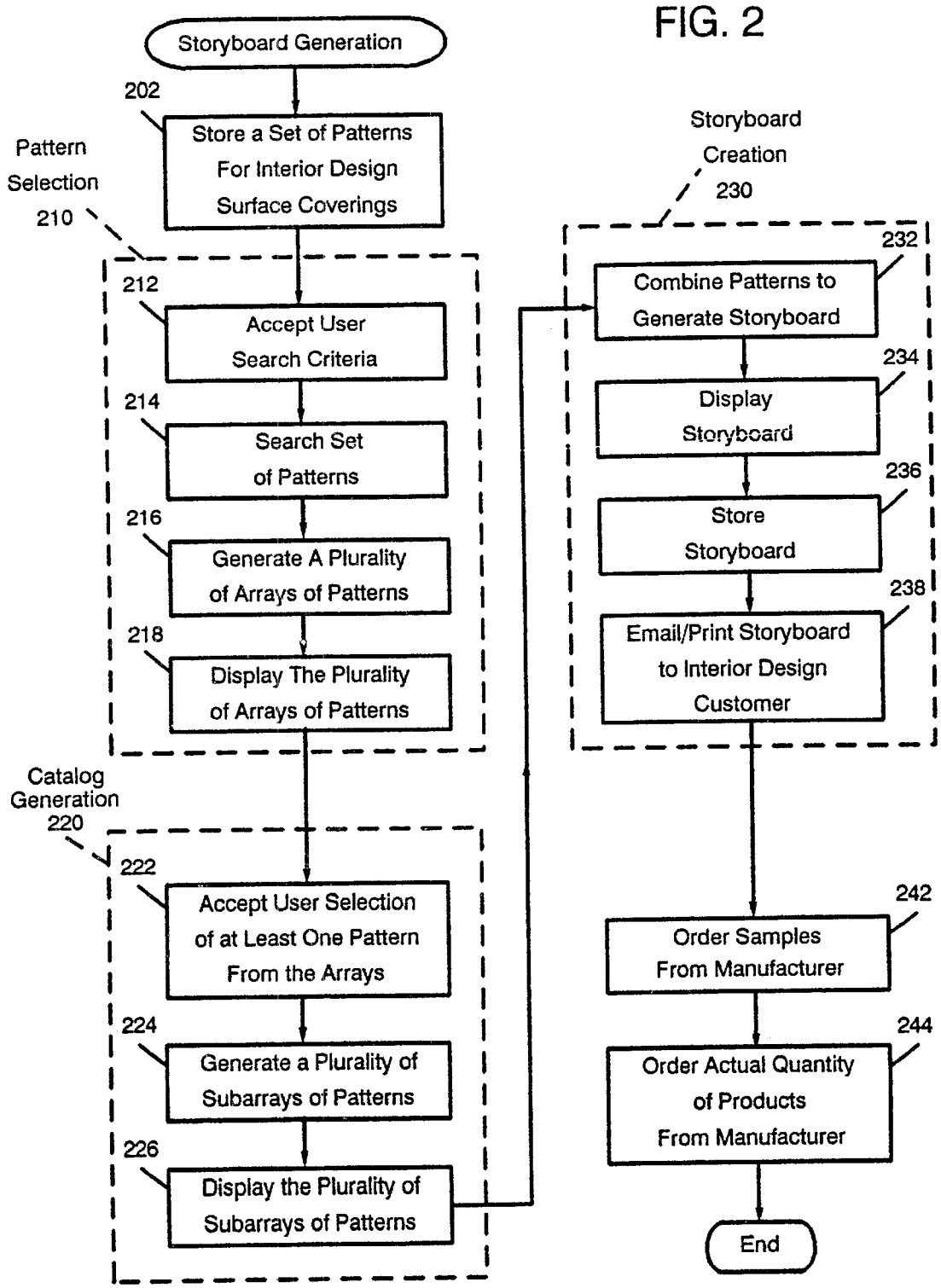
FIG. 2 is a flowchart illustrating overall operations for storyboard generation according to an embodiment of the present invention.

Referring now to FIG. 2, operations for generating a storyboard according to an embodiment of the present invention, now will be described. A storyboard may be generated in three general phases: pattern selection 210, catalog generation 220 and storyboard creation 230. However, the catalog generation phase may be skipped and operations for storyboard creation may proceed directly from pattern selection 210.

Referring again to FIG. 2, the set of patterns for interior design surface treatments is stored (Block 202), preferably in the pattern database 16a at the server Web site 12. These patterns may be obtained from product manufacturers 22, and/or may be generated by scanning actual samples of interior design surface treatments. As was described above, patterns also may include specifications and other attributes that may be provided by the manufacturer and/or by interior designers, and that are stored in the specification database 16b and attribute database 16c.

In the description that follows, an interior designer 18 also will be referred to as a "user". Continuing with the description of FIG. 2, user search criteria are accepted at Block 212. The user search criteria may be at least one user-selected attribute for the at least one of the surface treatment product types. The user search criteria also may include various aspects of the specification, such as identification of the manufacturer, identification of the primary color and an identification of an overall style. A hierarchy of attributes also may be provided, as will be described below, to allow a designer to formulate search criteria based on attributes that generally are used by designers in manually selecting surface treatments.

The user criteria preferably are accepted at the interior designer system 18. Then, referring to Block 214, a search is performed of the stored pattern attributes for the at least one of the surface treatment product types, to generate a plurality of arrays of patterns that meet the user search criteria at Block 216. It will be understood that the operations of Blocks 214 and 216 preferably are performed at the server Web site 12.

Then, at Block 218, the plurality of arrays of patterns that correspond to the search criteria are displayed, preferably at the interior designer system 18. Each array of patterns preferably corresponds to a surface treatment product type.

The catalog generation phase 220 of FIG. 2 now will be described generally. As shown in Block 222, user selection of at least one pattern from at least one of the plurality of arrays of patterns is accepted, preferably at the interior designer system 18. A plurality of subarrays of patterns then is generated at Block 224. Each subarray preferably corresponds to a surface treatment product type. At Block 226, the plurality of subarrays of patterns is displayed to produce a "catalog". The display of the plurality of subarrays of patterns allows the designer to manipulate the designer's preferred choices for each of the pattern types.

Storyboard creation according to the present invention (Block 230) now will be described generally. As shown in Block 232, at least one pattern from at least two of the subarrays of patterns or from at least two of the arrays of patterns are combined to generate a storyboard of interior design surface treatments for an interior space. Combining preferably takes place at the interior designer system 18. A storyboard is displayed, preferably at the interior designer system 18 at Block 234. The storyboard may be stored at Block 236. Although the storyboard may be stored at the interior designer system 18, it also preferably is stored at the server Web site 12. The storyboard then may be emailed to an interior design customer 19 at Block 238, either directly over the Internet 20 or via the server Web site 12. Prior to emailing the storyboard to the interior design client at Block 238, the storyboard may be annotated, for example to indicate the interior space to which the storyboard applies, and to identify which patterns are associated with which surfaces, such as floors, upholstered furniture, walls and countertops.

At Block 242, samples of the interior design surface treatments that are contained in the storyboard may be electronically ordered from the product manufacturers 22, either directly over the Internet or via the server Web site 12. Moreover, actual quantities may be ordered from manufacturers 22 at Block 224, either directly via the Internet or via the server Web site 12.

It will be understood that the operations of FIG. 2 need not occur sequentially. Thus, operations for an interior design project may begin at any block in FIG. 2, and may be performed iteratively based on the interior designer's selections and/or customer interaction.

Intermediate Level Description

An intermediate level description of systems, methods and/or computer program products for generating a storyboard of interior design surface treatments for an interior space, according to an embodiment of the present invention, now will be described in connection with FIGS. 3–19. A detailed implementation then will follow.

Figure 3:
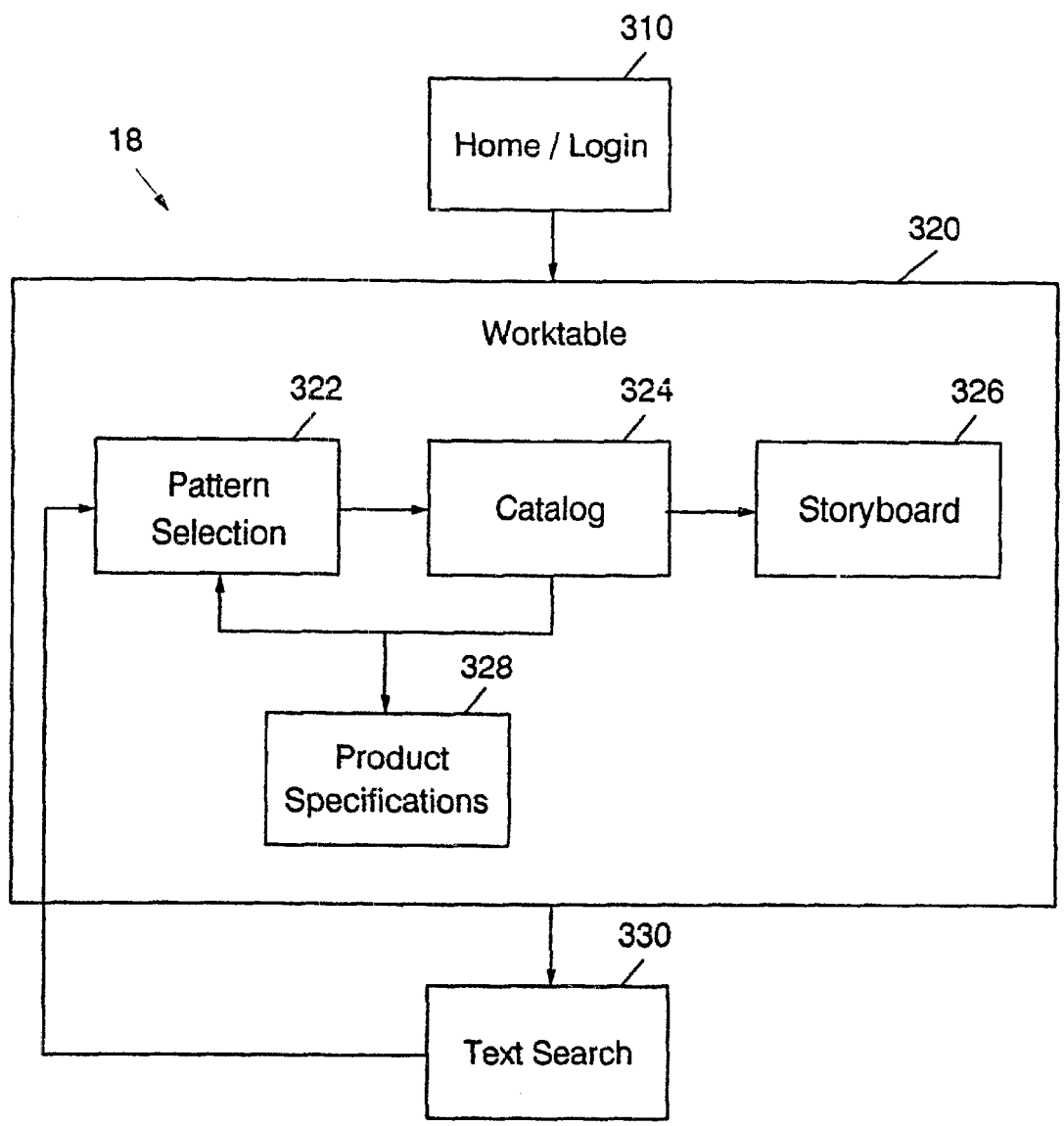
FIG. 3 is a block diagram of interior designer systems, methods and computer program products according to an embodiment of the present invention.

Referring now to FIG. 3, a block diagram of an interior designer system, method and/or computer program product 18 is shown. A home/login portion 310, a worktable portion 320 and a text search portion 330 preferably are included. Each of these portions may be embodied as a separate Web page. As will be described in detail below, the worktable 320 preferably includes a separate window for a pattern selection 322, a catalog 324, a storyboard 326 and product specifications 328. These windows may be contiguous, spaced apart and/or overlapping, and may be manipulated using conventional window manipulation techniques.

In general, the home/login portion 310 is the home page of the Web site and/or the login page. They may be combined into a single page. The worktable 320 preferably is a single page with four interrelated windows corresponding to the four modules of interrelated functionality. These windows include the pattern selection window 322 that includes the patterns that are selected by a search. The catalog 324 includes those patterns that are selected from the pattern selection window 322 by the interior designer. The storyboard 326 is created by the designer from the catalog 324 or directly from the pattern selection window 322. Product specifications 328 also preferably are included for each pattern. In general, as was described above, a designer first searches for products with certain patterns, then selects those patterns the designer is interested in, to build a catalog 324, then places the selected patterns in a storyboard 326 for presentation to a customer 19.

Figure 4:
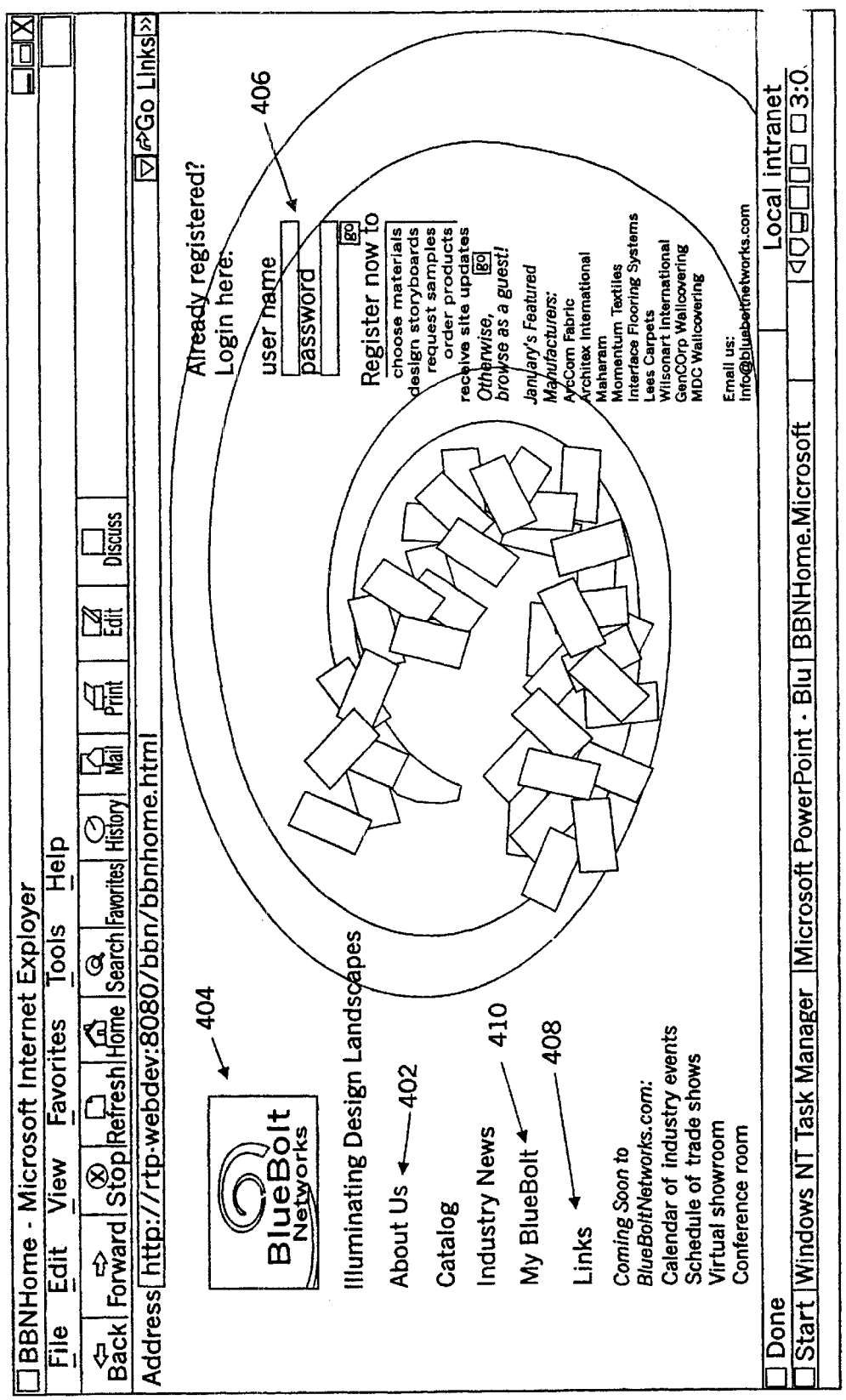
FIG. 4 illustrates a home/login page display or screen according to an embodiment of the present invention.

FIG. 4 illustrates an embodiment of a home/login display 310. The display 310 may include standard Web site features, such as descriptions of the company 402, descriptions of the application 404, a registration section 406, links to related sites 408, user customization 410, and other conventional Web site features. Upon supplying a user name and password in the registration section 406, and clicking on the "go" button, the designer can enter the worktable 320.

Figure 5:
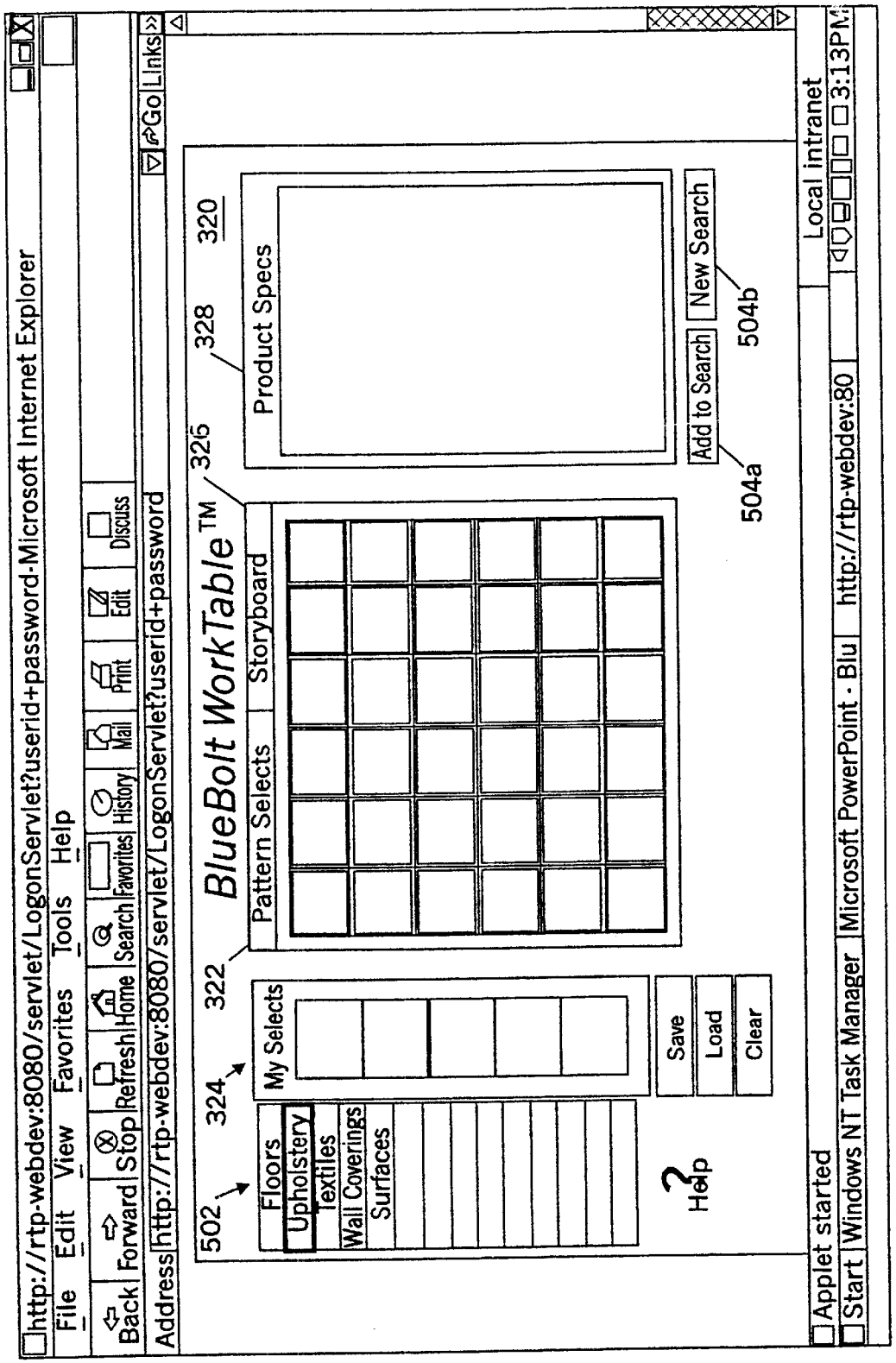
FIG. 5 illustrates an initial worktable display according to an embodiment of the present invention.

Referring now to FIG. 5, the worktable display 320 includes a pattern selection window 322, a catalog window 324, a storyboard window 326, and a product specification window 328. Buttons 504a and 504b also are included to access the text search function 330.

In general, the pattern selection window 322 displays a plurality of arrays of patterns, for example a plurality of 6×6 arrays of patterns that correspond to user search criteria, from a stored set of patterns for interior design surface treatments. Each array of patterns generally corresponds to a surface treatment product type. Representative surface treatment product types are shown in a list 502, and can include, for example, floor treatments (floor coverings), upholstery, textiles, wall treatments (wall coverings) and surfaces. Moreover, product types may also include a variety of product subtypes. Thus, carpet, vinyl tile, sheet flooring, porcelain tile and ceramic tile may be included for floor treatments, and solid materials and laminates may be included for surfaces.

Multiple arrays of pattern selections may be included in window 322, as will be described below. The catalog section 324 includes a plurality of subarrays of patterns. Each subarray corresponds to a surface treatment product type 502. The subarray is generated in response to user selection from the corresponding array of patterns for the corresponding surface treatment type. The subarray may include one or more patterns that are of interest to the designer, and that preferably are individually selected from the pattern selection window 322. The product specification area 328 contains product specifications for a selected pattern. In FIG. 5 a tab for storyboard 326 also is shown. The storyboard will be described below.

Figure 6:
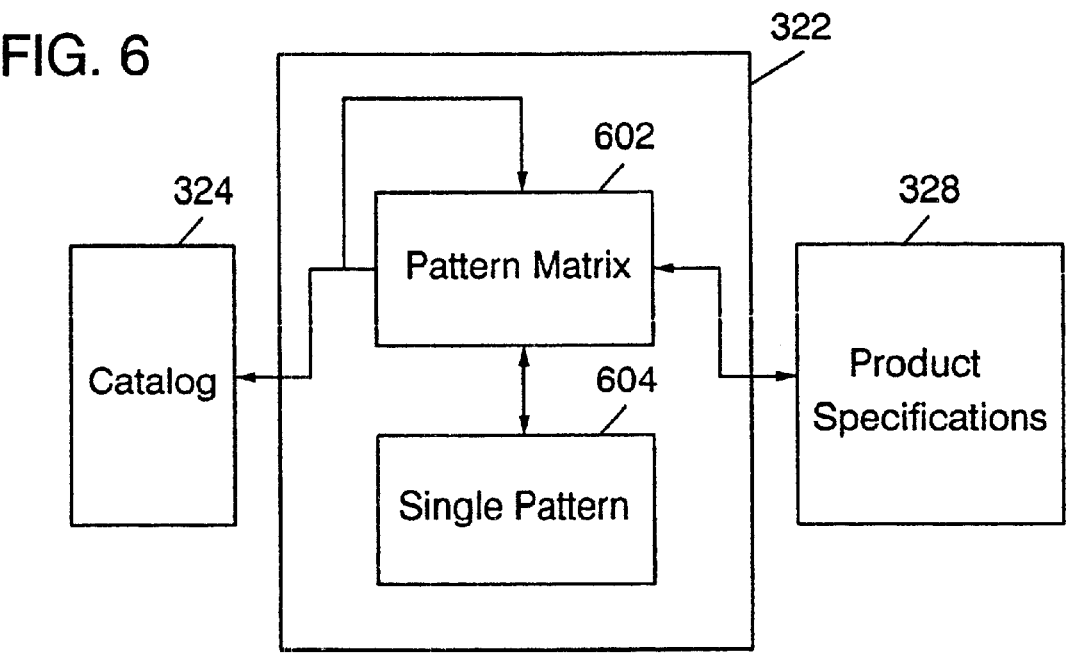
FIG. 6 is a block diagram of pattern selection according to an embodiment of the present invention.

FIG. 6 is a block diagram of pattern selection 322 according to an embodiment of the present invention. As shown in FIG. 6, the pattern selection window 322 allows display of a plurality of arrays of patterns that correspond to user search criteria. The arrays of patterns are referred to in FIG. 6 as a pattern matrix 602. A zoom function also preferably is provided to allow display of a single pattern 604 at a higher resolution. Moreover, selections from the pattern matrix 602 may be placed in the catalog area 324, based on the designer's selections. Product specifications 328 for a highlighted pattern in the pattern matrix 602 or for a single pattern 604, also are displayed.

More specifically, the pattern matrix 602 is the selection of patterns that have met the designer's search criteria, based on a text search of attributes and/or a search of patterns that will be described below. In the embodiment described herein, the matrix displays 36 items simultaneously. If there are more than 36 items, the user may page through the items. Individual patterns may be "dragged-and-dropped" from the matrix 602 to the catalog 324. The pattern then will be displayed in the catalog 324, as well as in the pattern matrix 602. The mouse may be used to point at a pattern in the matrix 602 or in the catalog 324, in order to display information about the product in the production specification window 328. If a pattern in the matrix is selected by clicking, the information in the product specification will stay in the window.

A pattern in the matrix 602 may be right clicked to allow the user to zoom in or search. In zooming, a single pattern 604 may be displayed within the matrix boundary. When a single pattern is displayed, right clicking the mouse can return to the entire matrix 602. When a pattern is selected and a right click is performed, a new search may be performed based on pattern content, to reload the matrix 602 with patterns most like the selected pattern. The search preferably is performed at the server Web site 12 using a search engine such as Oracle VIR or other similar pattern-matching search engines.

Figure 7:
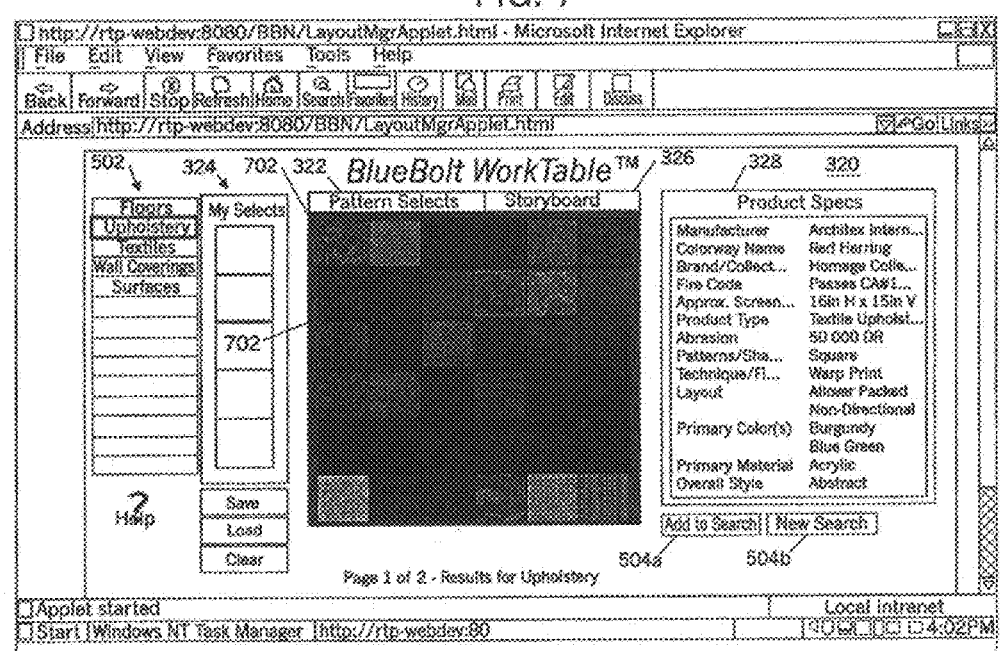
FIG. 7 illustrates a pattern selection page display on a worktable display according to an embodiment of the present invention.

FIG. 7 illustrates a pattern selection page display 322 on a worktable 320, wherein a pattern selection has been loaded based on user criteria. As shown in FIG. 7, the pattern matrix or array 322 displays the first two pages of upholstery patterns that meet the designer's criteria. The upholstery product in the list 502 is highlighted to indicate upholstery selection. The pattern in the second row and fourth column has been selected via the mouse, so that its product information is displayed in the production specification window 328. Moreover, as shown in FIG. 7, each pattern preferably includes a matching bar 702 adjacent, here shown as beneath, the pattern. The matching bar 702 provides an indicator of the extent that the pattern matches the user search criteria. In FIG. 7, the catalog or subarray of patterns 324 is empty, because the designer has not yet selected patterns from the pattern matrix or array 322.

Figure 8:
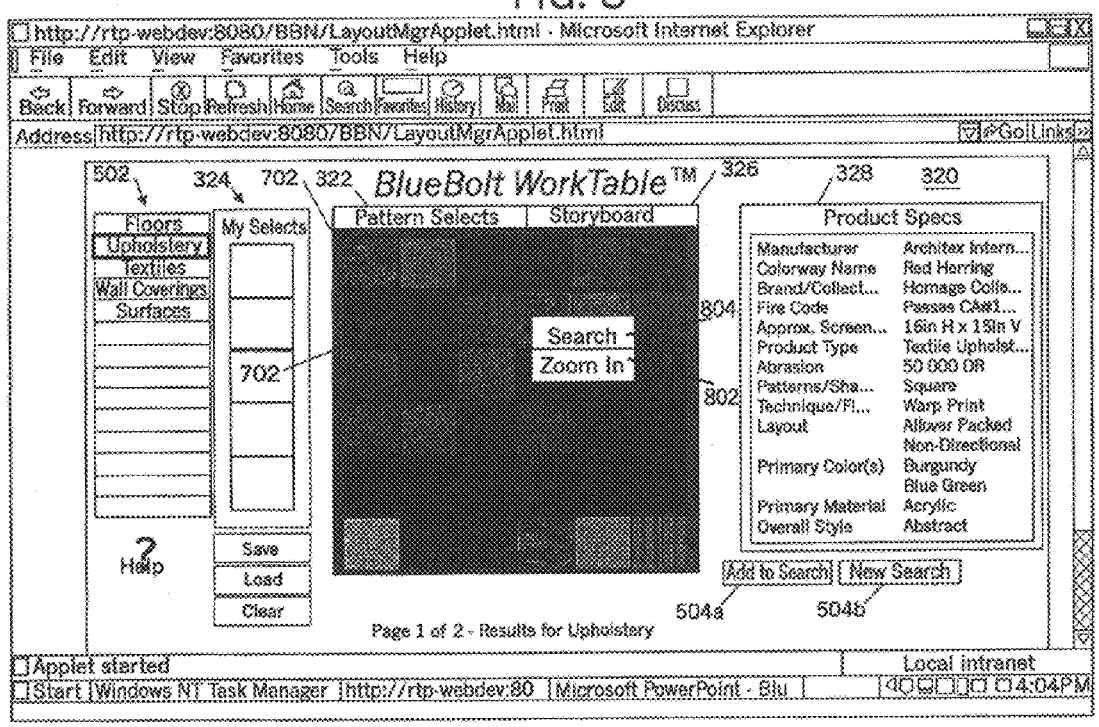
FIG. 8 illustrates a right mouse button menu on a pattern selection page display according to an embodiment of the present invention.
Figure 9:
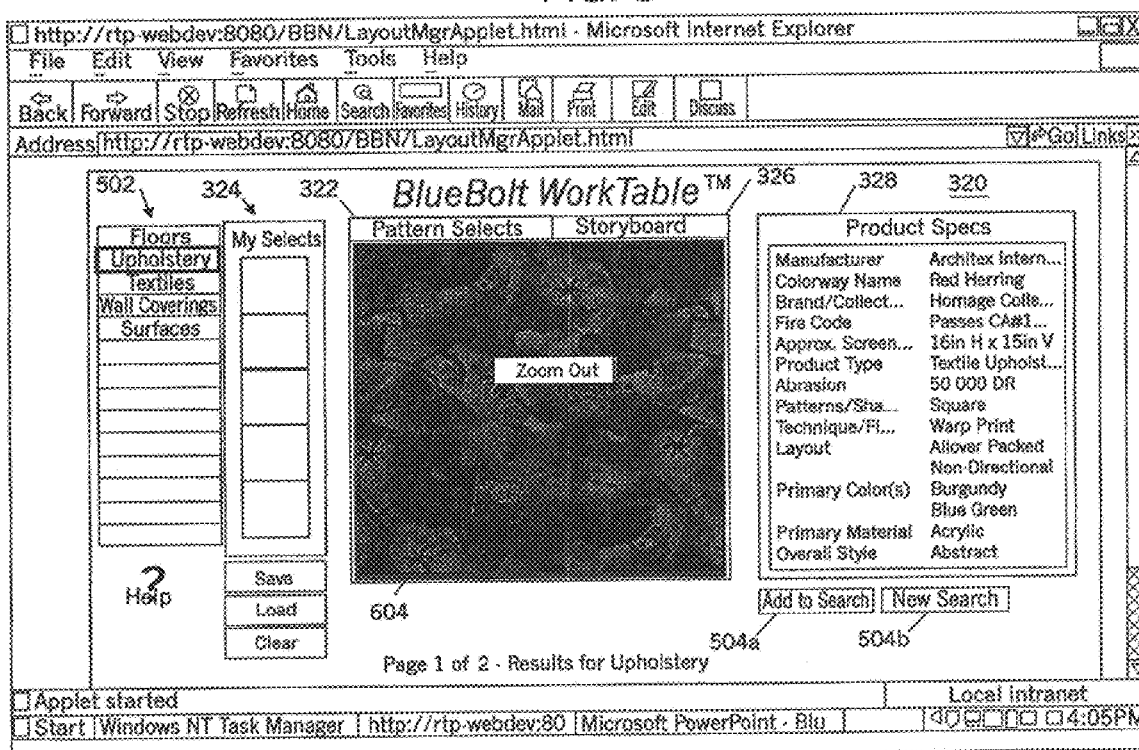
FIG. 9 illustrates a single pattern display on a worktable display according to an embodiment of the present invention.
Figure 10:
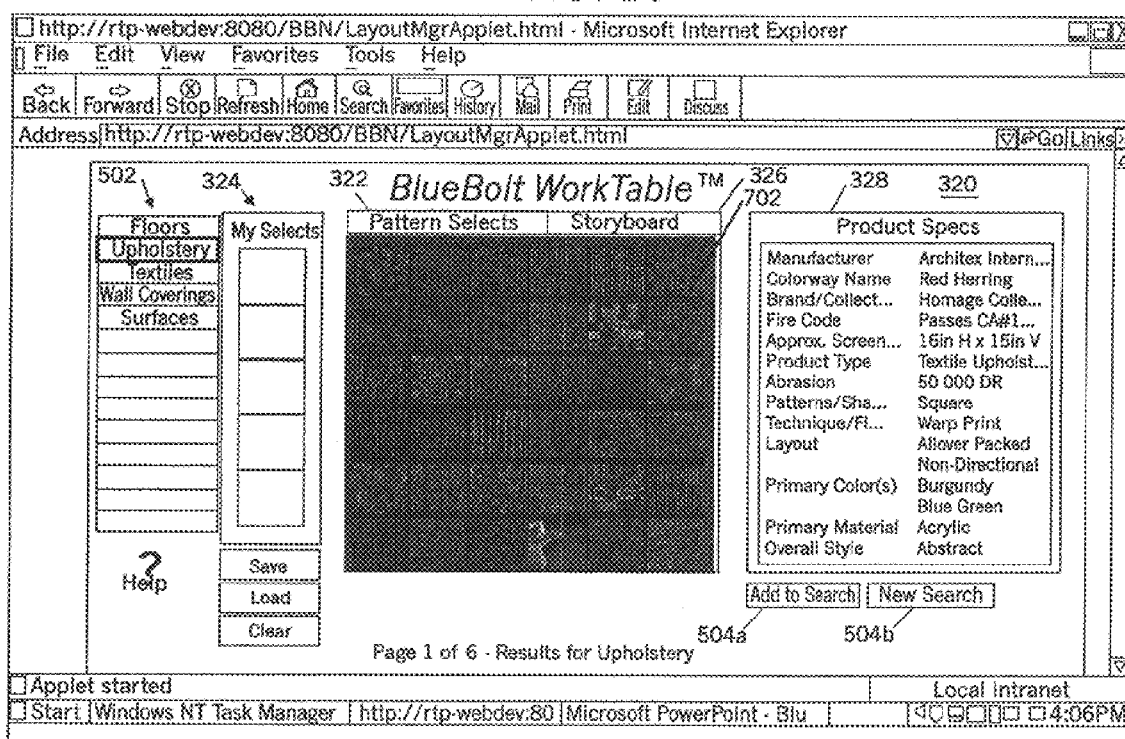
FIG. 10 illustrates a display of results of a visual search according to an embodiment of the present invention.

FIG. 8 is similar to FIG. 7, but illustrates the menu commands that may be obtained by right clicking the mouse on a selected pattern in the matrix 322. In particular, a zoom in or search may be performed. When a zoom in 802 is performed, only the selected pattern is displayed with the menu item for returning to all the patterns. See FIG. 9. When the search button 804 is selected, a new set of patterns is displayed in the pattern matrix 322. The new set of patterns may be obtained using, for example, Oracle's VIR search mechanism, by performing pattern matching to the selected pattern. See FIG. 10. In FIG. 10, the original pattern that was used to perform the new search is displayed in the upper left box of the matrix 322. The remaining boxes of the matrix 322 contain patterns that closely match the original pattern, based on the pattern matching search. Alternatively, the new set of patterns may be obtained by searching for other patterns that closely match the categories and values of the selected pattern.

Figure 11:
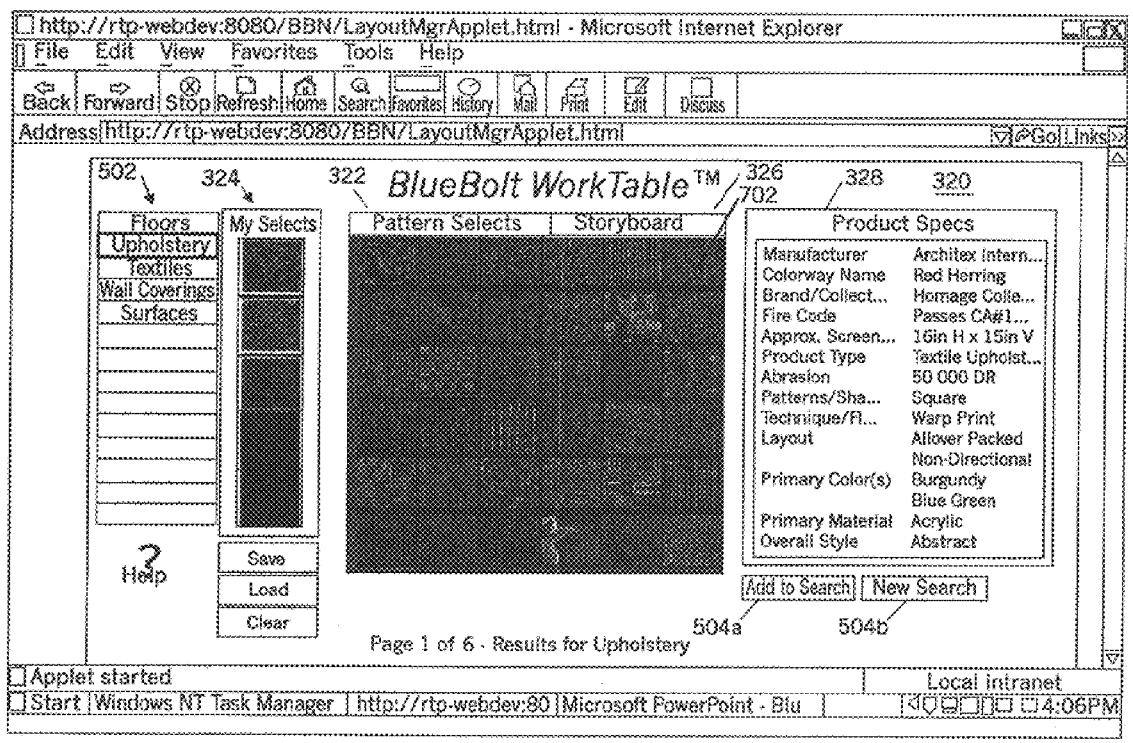
FIG. 11 illustrates a display of movement of patterns into a catalog according to an embodiment of the present invention.

FIG. 11 illustrates the designer's selection of patterns from the arrays or matrices 322, moving the selected patterns into the catalog 324 for use in building a storyboard 326. The catalog 324 now will be described in connection with FIG. 12.

Referring now to FIG. 12, the catalog 324 includes a plurality of subarrays of patterns that are referred to in FIG. 12 as a "display list" 1202. Each subarray can include one or more patterns. Each subarray corresponds to a surface treatment product type 502, and is created in response to designer selection from the corresponding array of patterns 322 for the corresponding surface treatment type 502. Stated differently, the catalog 324 contains the designer's patterns of choice for each product type 502. The designer selects the patterns from the pattern selection area 322 and preferably stores them in the catalog 324 as an intermediary to placing the patterns in the storyboard. In another alternative, the designer may place patterns directly from the pattern selection matrix 322 into the storyboard 326.

In the catalog 324, clicking on the product type tab 502 displays the patterns chosen for that product, so that the designer can add or delete patterns. Individual patterns are selected from the pattern selection matrix 322 and dragged and dropped into the catalog display list 1202. As was shown in FIG. 11, five patterns may be selected for a product type 502. However, more than five patterns may be selected by adding slots to the display list as well. The slots may be added one at a time or in groups of five. It will be understood that the same pattern may be added to the catalog 324 more than once. Individual patterns from the catalog then may be dragged and dropped to be added to the storyboard 326.

Catalogs may be saved by pressing the save button 1102. The catalogs may be saved at the interior designer system 18, but preferably are saved at the server Web site 12. The clear button 1104 may be used to delete the current product types display list. The load button 1106 may be used to load a previously stored catalog 324. An individual item may be removed from the catalog 324 by right clicking on the selected pattern in the catalog. Similar to the description above for the pattern selection matrix 322, when the mouse pointer is run over a pattern, that pattern's specifications are displayed in the product specification area 328.

Figure 13A:
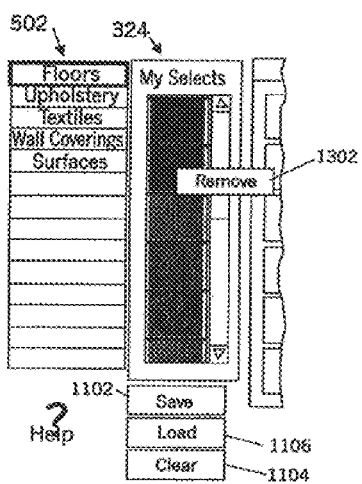
FIGS. 13A–13C illustrate detailed displays of a catalog according to an embodiment of the present invention.
Figure 13B:
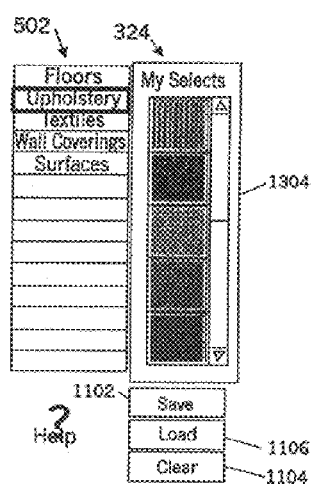
Figure 13C:
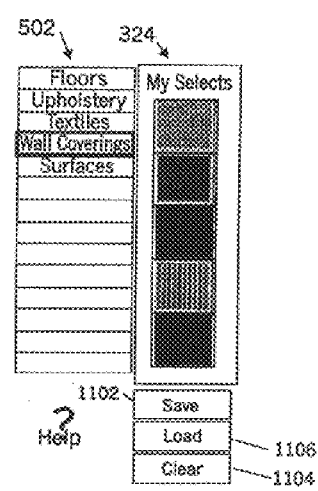

FIGS. 13A–13C illustrate detailed displays that describe various operations that can be performed on the catalog 324. Specifically, FIG. 13A illustrates an example of four pattern choices for floors, with the remove menu 1302 on pattern 2. FIG. 13B illustrates a catalog for upholstery. Since more than five items were selected, a scroll bar 1304 is present. FIG. 13C illustrates a catalog 324 for wall treatments. As shown, there are only three items selected, and the third item may be placed in the fourth box. Thus, the designer can place the selected patterns in the catalog 324 at any position, for example to indicate best choices, next best choices, etc. The load and save buttons 1106 and 1102, respectively, move the catalog to and from the file system. The clear button 1104 empties the current product selections.

Figure 14:
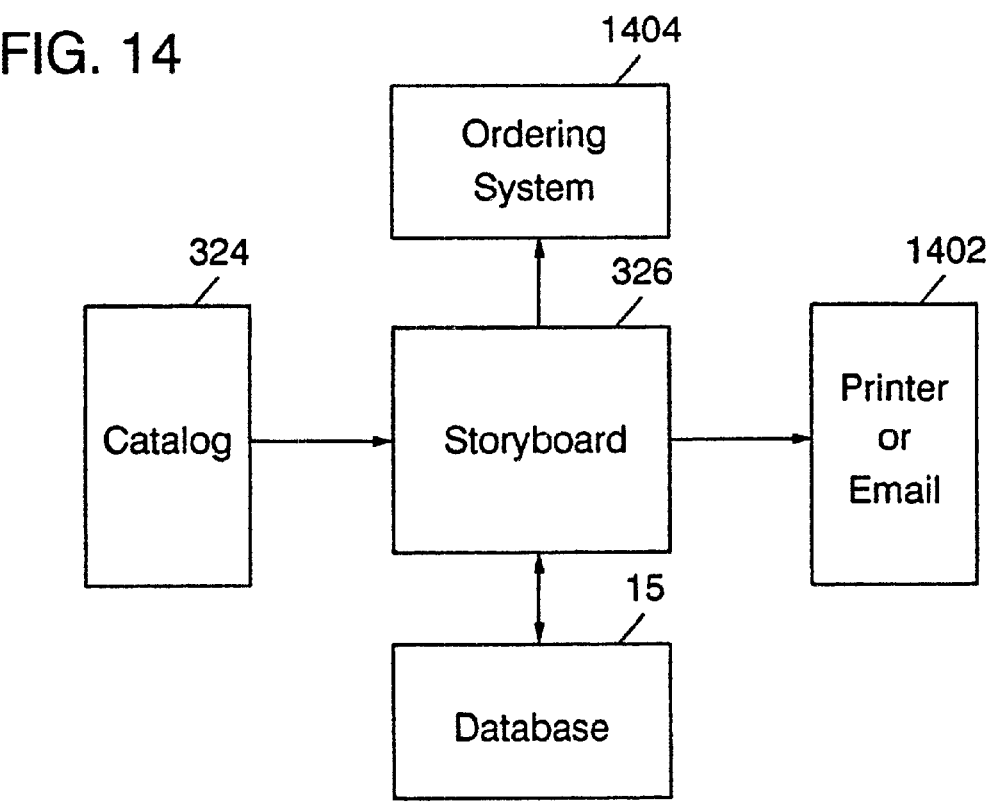
FIG. 14 is a block diagram of a storyboard according to an embodiment of the present invention.

FIG. 14 is a block diagram of a storyboard 326. In general, at least one pattern from the at least two of the subarrays of patterns in the catalog 324 may be combined into a single screen, window and/or file to produce a storyboard 326 of interior design surface treatments for an interior space. Patterns from the catalog and text annotations can be placed on the storyboard 326, resized, moved, etc. The storyboard itself can be detached from the worktable 320 and set up in its own window, so that it can be enlarged and made easier to work with, as with a conventional window.

Still referring to FIG. 14, patterns from the catalog 324 can be dragged and dropped on the storyboard 326. Patterns can be resized or moved using conventional window functionality. Text can be added to the storyboard via the right mouse button menu, to annotate the storyboard. This text may be used to describe the pattern use, such as a floor treatment, a wall treatment, etc. Storyboards can be saved to the database server 15 and/or at the interior designer system 18. Storyboards also can be loaded from the database server 15 and/or the interior designer's system 18. Storyboards also can be printed and emailed to customers 19, as shown at Block 1402. Samples of any or all the patterns may be ordered from a manufacturer using an ordering system 1404. Moreover, actual quantities of the material also may be ordered. When ordering actual quantities, assistance may be provided to determine the quantities needed by including a measuring function as part of the ordering function. Ordering may be implemented by selecting the item and using an order sample menu item or an actual quantity menu item from a menu bar.

A storyboard 326 on the worktable 320 may only occupy a small window. However, it may be detached from the worktable 320 and placed in its own window, so that it can be manipulated separately from the worktable 320. The storyboard 326 then may be reattached to the worktable 320.

Figure 15:
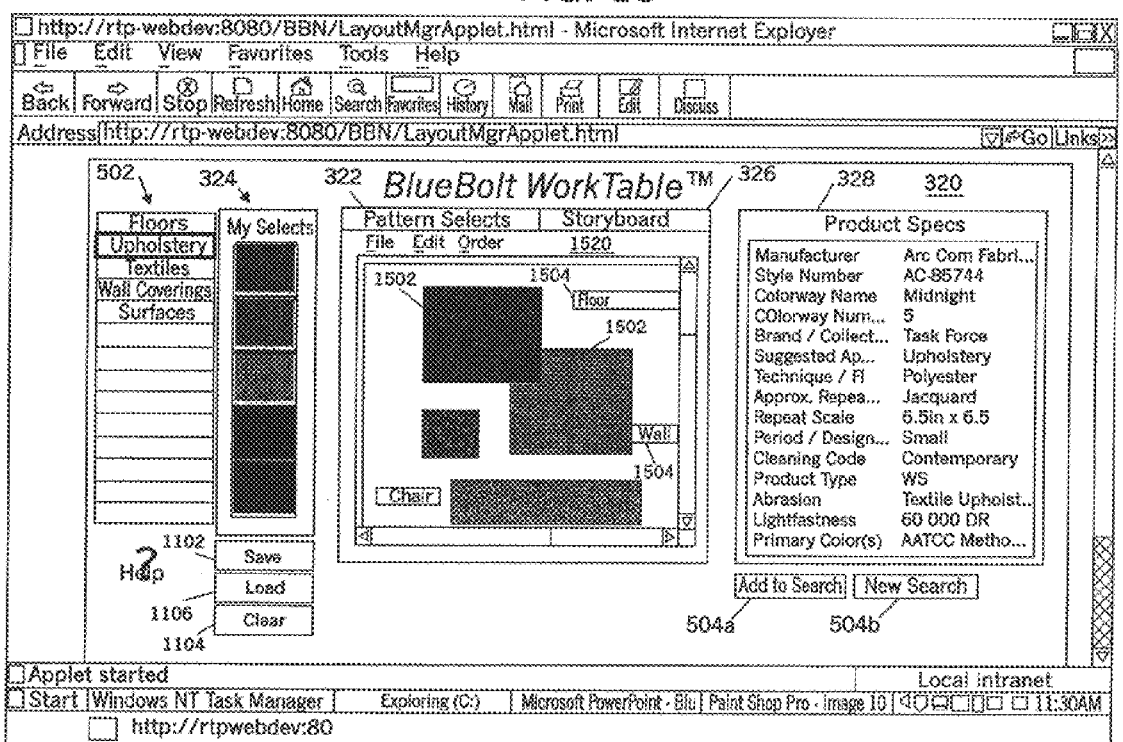
FIG. 15 illustrates a worktable display including a storyboard display according to an embodiment of the present invention.
Figure 16:
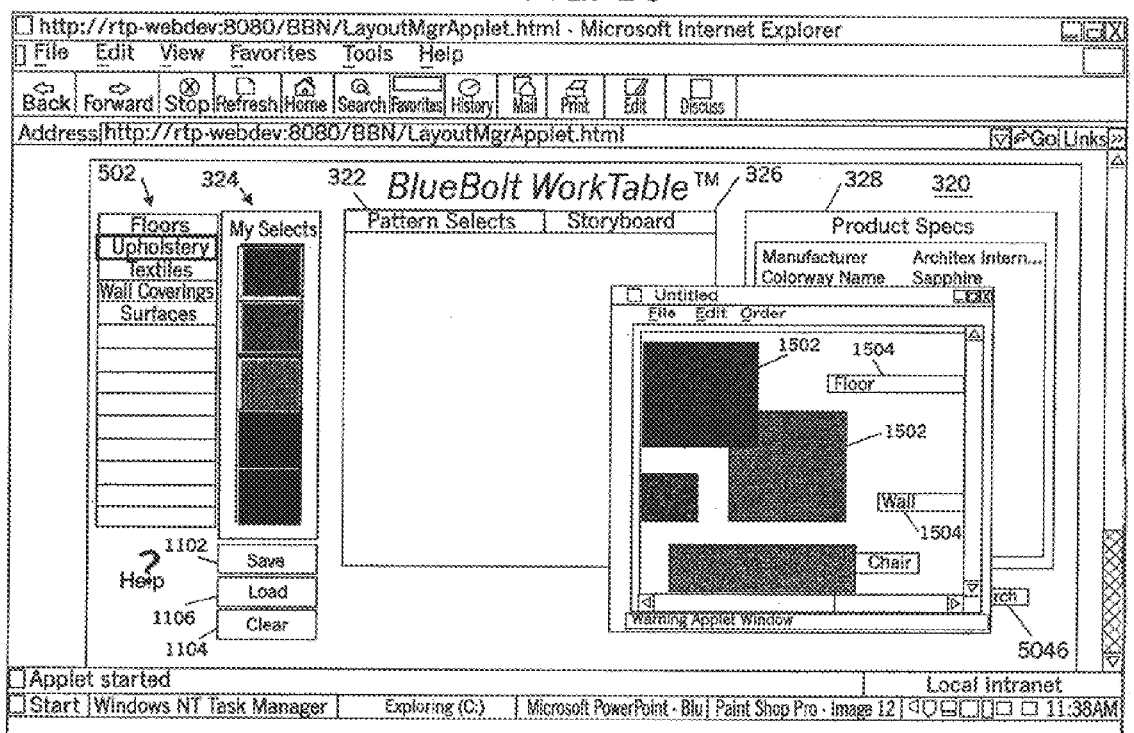
FIG. 16 illustrates a storyboard display detached from a worktable display according to an embodiment of the present invention.
Figure 17:
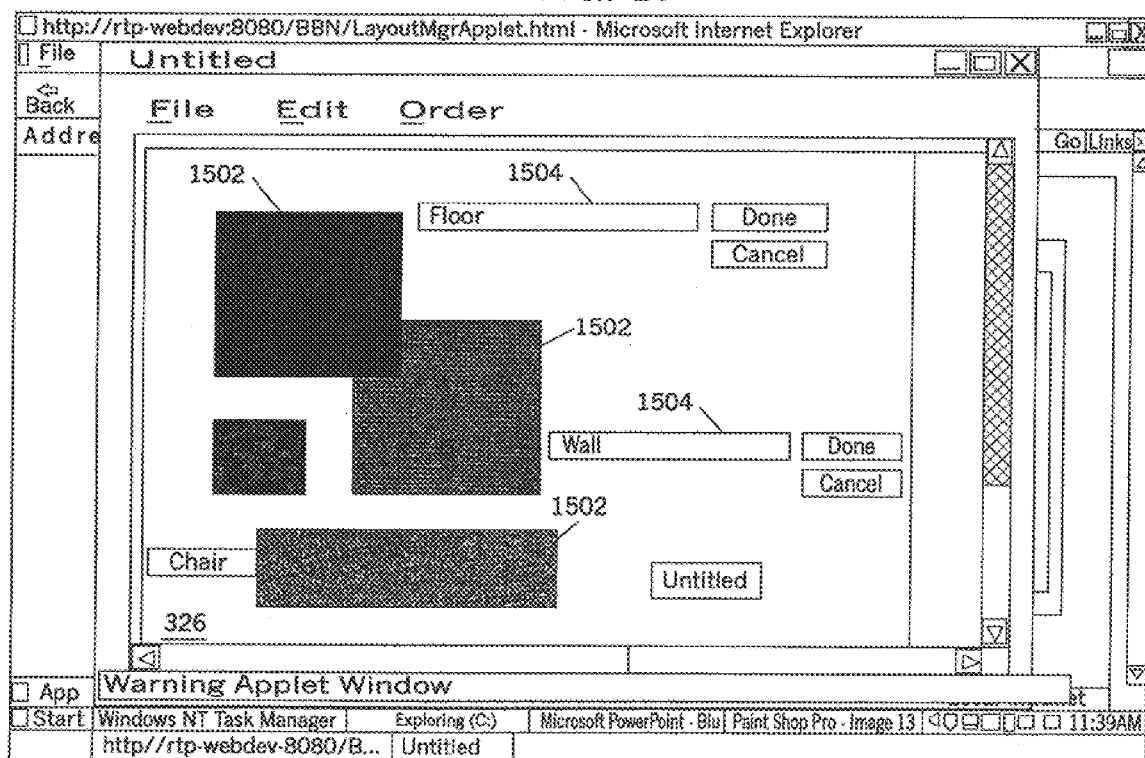
FIG. 17 illustrates a storyboard display that is resized according to an embodiment of the present invention.

FIG. 15 illustrates a worktable display 320 including a storyboard 326 having patterns 1502 and annotated text 1504. FIG. 16 illustrates the storyboard 326 detached from the worktable 320. FIG. 17 illustrates the storyboard window that has been resized.

It will be understood that the storyboard 326 has been illustrated as a planar, two-dimensional storyboard with fabric patterns placed at various locations therein. However, a three-dimensional "virtual room" storyboard representation also may be provided that includes a virtual floor, virtual walls, virtual countertops, virtual furniture and other virtual items. The selected patterns then may be mapped onto these virtual items, for example using conventional texture mapping techniques, to produce a virtual representation of the interior space.

Referring back to FIG. 2, pattern selection 210 now will be described in greater detail. In particular, accepting user search criteria (Block 212), searching the stored set of patterns (Block 214) and generating a plurality of arrays of patterns that meet the user search criteria (Block 216) now will be described.

Figure 18:
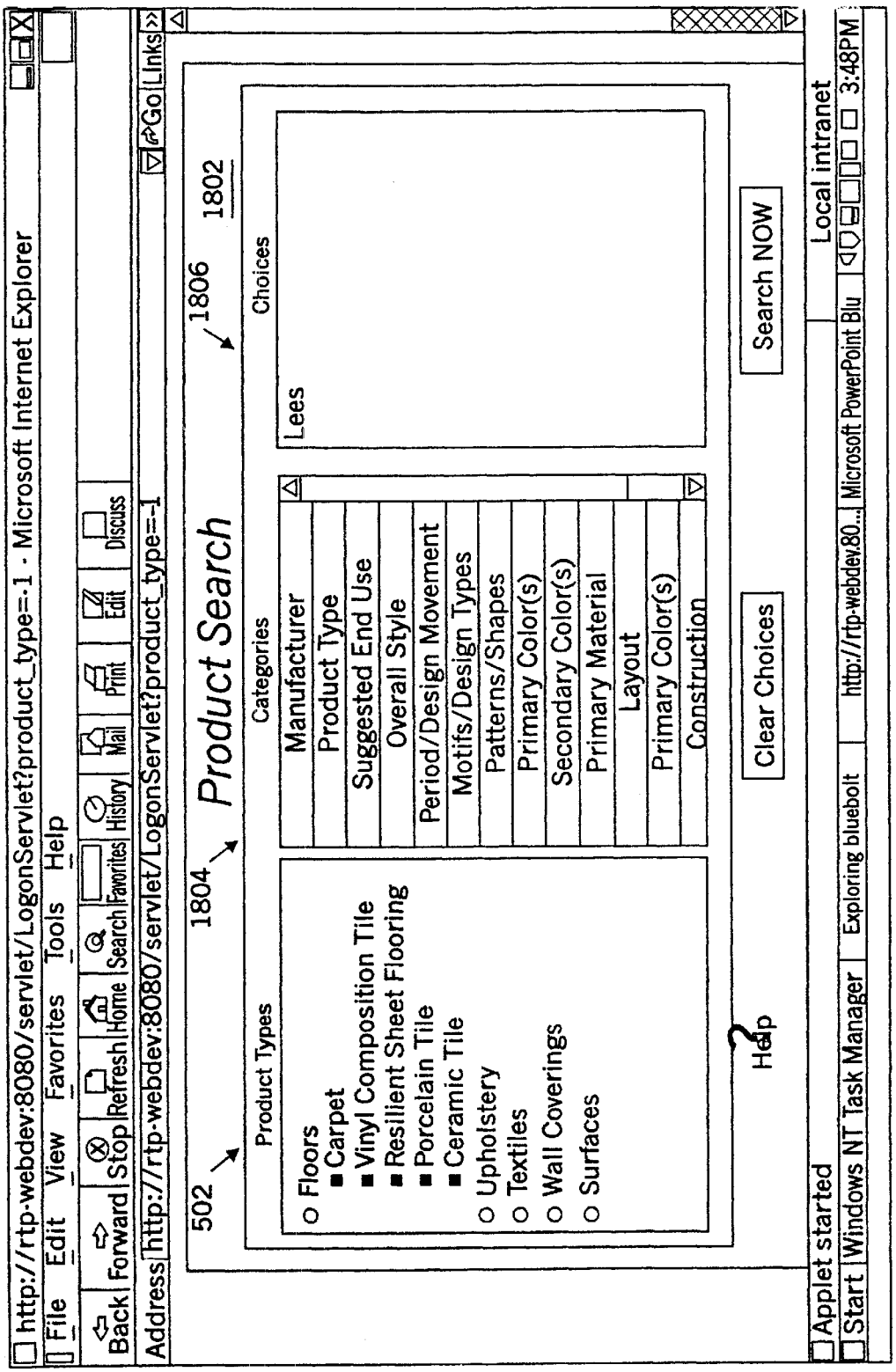
FIG. 18 illustrates a text search display according to an embodiment of the present invention.

More specifically, FIG. 18 illustrates a text search screen that may be initiated by depressing one of the search buttons 504a and 504b of FIG. 5. Upon depressing one of the search buttons 504a and 504b, the text search screen of FIG. 18 may be displayed. The screen includes a product search window 1802 and a separate window that lists product types 502, product attributes, also referred to as "categories" 1804 and product choices or values 1806. In general, a plurality of product types 502 may be supported. In the embodiment of FIG. 18, five product types are supported: floors, upholstery, textiles, wall treatments and surfaces. However, different and/or other product types may be supported. Moreover, one or more of the product types may include one or more subtypes. For example, as shown in FIG. 18, floors may includes subtypes of carpet, vinyl composition tile, resilient sheet flooring, porcelain tile and ceramic tile. A search preferably is conducted on one of the subtypes at a time.

Once the type/subtype 502 has been selected from the product type window 502, the attributes, also referred to herein as "categories", associated with the product type or subtype, is displayed in the product attribute window 1804. When an attribute is selected from the attribute window 1804, the attribute choices or values are displayed in the choices window 1806.

For an attribute or category 1804, the designer may select as many values or choices 1806 as desired. Moreover, the designer may specify more than one item in the category box 1804 and may select multiple choice values 1806 for each category.

Figure 19:
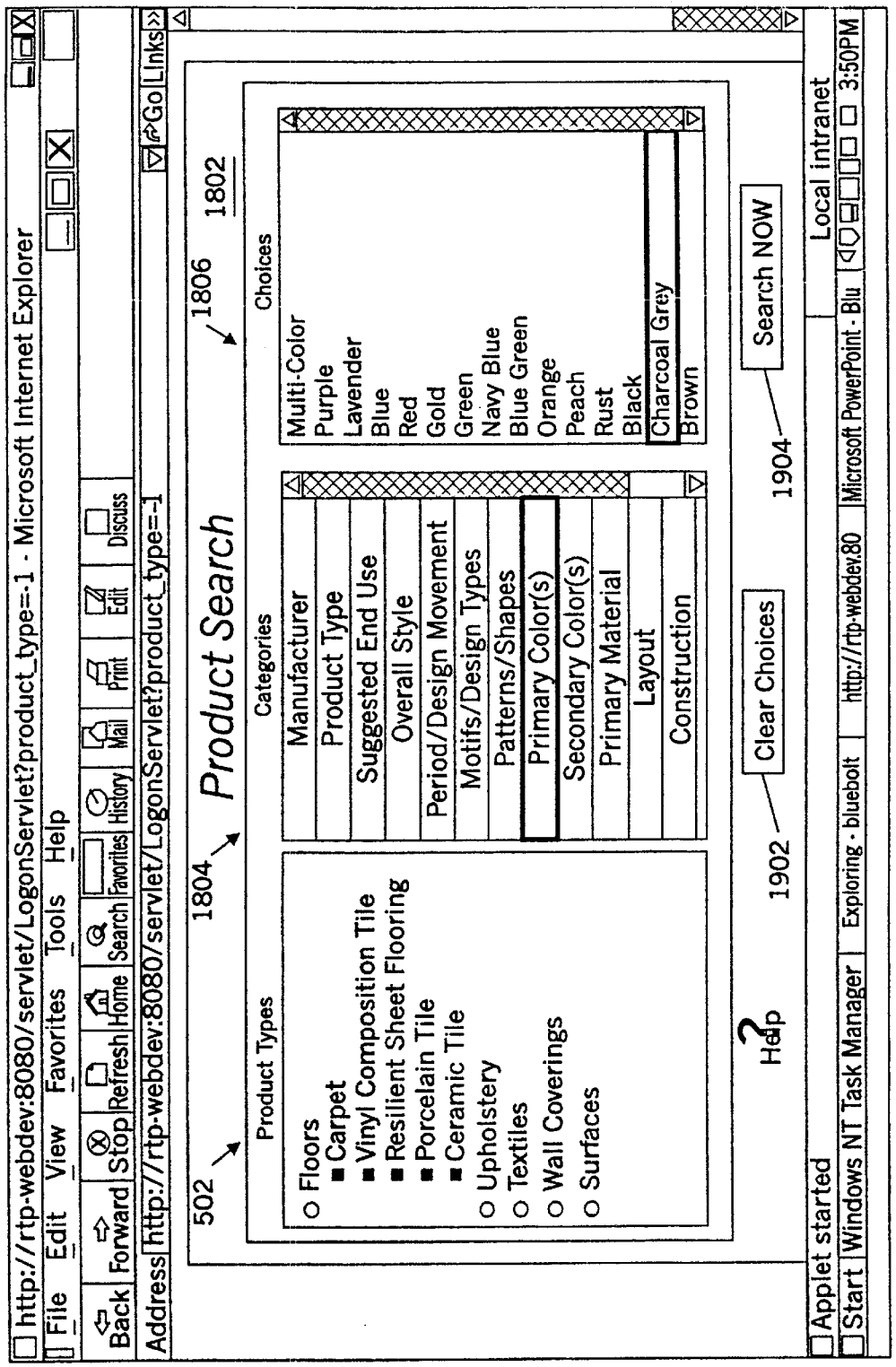
FIG. 19 illustrates a text search display with attribute values selected according to an embodiment of the present invention.

FIG. 19 illustrates an example of a text search screen 1802 with attribute values selected. In particular, as shown in FIG. 19, the designer can select the carpeting product type 502 and the category or attribute 1804 of primary color(s). The choices or values box 1806 lists all of the primary colors that are available, and the designer has selected charcoal grey. Other values 1806 may be selected for the other categories 1804. An example of a list of attributes (categories) 1804 and values (choices) 1806 for various product types 502 is provided in the following Table. It will be understood that the categories 1804 and/or the values 1806 may be provided by the manufacturer, and/or may be added based on designer input at the server Web site 12. It also will be understood that a color palette may be provided to allow actual color selection instead of or in addition to color name selection. Preferably, when an attribute has an unconstrained value range, it is not searchable. In the following Table, the left column lines indicate an attribute or category, and the right column lists corresponding values or choices.

TABLE

| Attribute | Value |
|---|---|
| File Name | Unconstrained Value |
| Manufacturer | Arc Com Fabrics; Architex International; Momentum Textiles; Gen Corp Wallcoverings; Lees; MDC Wallcoverings; Paul Brayton Designs; Wilson Art International; etc. |
| Product Type | Carpet; Vinyl Composition Tile; Resilient Sheet Flooring; Porcelain Tile; Ceramic Tile; Solid Surface Material; Textile Upholstery; Bedding Fabric; Cubicle Fabric; Drapery Fabric; Panel Fabric; Leather Upholstery; Vinyl Upholstery; Vinyl Wallcovering; Textile Wallcovering; Laminate |
| Application | Bedding; Counter Top; Cubicle; Drapery; Drapery/Bedding; Floorcovering - Base; Floorcovering - Corridor; Floorcovering - Main; Panel; Resilient Flooring; Upholstery; Wallcovering |
| End Use | Education; Healthcare; Hospitality; Office; Residential; Retail; Transportation |
| Overall Style | Abstract; Check; Conversational/Novelty; Floral; Geometric; Plaid; Plain/Solid; Regional/Ethnic; Stripe; Texture |

TABLE-continued

| Attribute | Value |
|---|---|
| Design Movement | Contemporary; Traditional; Transitional; African Influence; Art Deco; Art Noveau; Arts and Crafts; Asian Influence; Baroque; Bauhaus; Coionial; Empire; French Country; Impressionist; Latin American Influence; Jacobean; Naive/Primitive; Neoclassic; Renaissance; Southwest; Toile; Victorian |
| Motifs/Design Types | Animal; Animal Skin; Architecture; Bamboo; Bark; Basket/Vase; Bird; Botanical; Bouquet; Bow/Ribbon; Brushstroke; Bud/Sprig; Butterfly/ Insect; Cat/Dog; Celestial; Chain/Rope/Tassel; Daisy; Ditsy; Fan; Feather; Fiber; Flamestitch; Fleur de lis; Flower; Folkloric; Food; Fruit/ Vegetable; Garden Flowers; Gariand/Wreath; Grasses (Wheat; Greek Key; Heart; Heraldry; Horse; Hunting/Fishing; Juvenile; Lattice/Trellis; Leather Look; Leaves; Line (Scribble; Marbelized; Marine Lite; Medallion; Mosaic; Musical; Nautical; Numberl Letter; Object; Optical; Organic; Paisley; Patchwork; People; Puzzle; Reptile; Rose; Scallop; Scenic; Scroll; Shell; Speckle; Splatter; Sponge Look; Sports; Stone; Tile; Tone on Tone; Tools; Toy/Game; Transportation; Travel; Tree; Trompe loeii; Tropical; Tulip; Vines; Water/Wave; Western; Wildflowers; Woodgrain; Woven Look |
| Patterns | Argyle; Awning Stripe; Basketweave; Chalk Stripe; Check; Circle; Diamond; Gingham; Glen Plaid; Grasscloth; Grid; Herringbone; Houndstooth; Madras; Novelty Check; Novelty Plaid; Novelty Stripe; Ogee; Oval; Pin Stripe; Polka Dots; Polygon; Rep Stripe; Rectangle; Square; Tartan; Ticking; Triangle; Zigzag |
| Primary Color(s) | Beige; Black; Blue; Blue Green; Brown; Burgundy; Charcoal Grey; Dark Green; Gold; Green; Grey; Lavender; Light Blue; Light Green; Magenta; Mauve; Navy Blue; Off-White; Olive Green; Orange; Peach; Pink; Purple; Red; Rust; Taupe; White; Yellow; Yellow Green; Bleached-Cherry, Maple, Metallic, Multi-Color, Pine |
| Secondary Color(s) | Beige; Black; Blue; Blue Green; Brown; Burgundy; Charcoal Grey; Dark Green; Gold; Green; Grey; Lavender; Light Blue; Light Green; Magenta; Mauve; Navy Blue; Off-White; Olive Green; Orange; Peach; Pink; Purple; Red; Rust; Taupe; White; Yeliow; Yellow Green; Bleached-Cherry, Maple, Metallic, Multi-Color, Pine |
| Color Quaiity | Bright; Pastel/Light; Dark; Neutral/Muted; Medium; Jewel Tone; Cool; Warm |
| Primary Material | Acrylic; Cotton; Hemp; Leather; Linen; Modacrylic; Nylon; Olefin; Olefin/Polypropylene; Polyester; Polypropylene; Ramie; Rayon; Silk; Sisal Synthetic; Synthetic/Natural; Vinyl; Wool; Wool/Nylon |
| Repeat Scale | Extra Large; Large; Medium; Small; Mini; None |
| Layout | Directional; Non-Directional; Allover Packed; Allover Tossed; Allover Set; Border; Check/Plaid; Frame; Spaced Set; Spaced Tossed; Stripe; Wavy Stripe |
| Match Type | Drop Match; Free Reverse; Half Drop Match; Quarter Drop Match; Random; Reverse Drop Match; Set or Self Match |
| Technique | Batik/Tie Dye; Brocade; Chenille; Damask; Embossed; Embroidery; Gloss Finish; Jacquard; Ikat/Ikat Look; Matlasse; Matte Finish; Moire; Ombre; Overprint; Pebble Finish; Pile/Velvet; Print; Satin; Sheer; Taffeta; Tapestry; Woven/ Woven Look; Warp Print |
| Construction | Broadloom; Roll; Fusion Bonded; Modular Tile; Tufted; Woven-Axminster; Woven-Velvet; Woven-Wilton |
| Pile Type | Cut Pile-Saxony Plush; Cut and Loop Pile; Loop Pile-Level Loop; Loop Pile-Multi Level Loop; Cut Pile-Texture; Cut Pile-Velvet |
| Dye Method | Piece Dyed; Printed; Solution Dyed; Stock Dyed; Yarn Dyed |
| Price/Yd. Range | Under $25; $25–$45; Over $45 |

TABLE-continued

| Attribute | Value |
| --- | --- |
| Style Name | Unconstrained Value |
| Style Number | Unconstrained Value |
| Colorway Name | Unconstrained Value |
| Colorway Number | Unconstrained Value |
| Band/Collection | Unconstrained Value |
| Exact Content | Unconstrained Value |
| Width | Unconstrained Value |
| Repeat | Unconstrained Value |
| Screen Image | Unconstrained Value |
| Abrasion | Unconstrained Value |
| Cieaning Code | Unconstrained Value |
| Lightfastness | Unconstrained Value |
| Treatment | Unconstrained Value |
| Custom Colors | Unconstrained Value |
| Fire Code | Unconstrained Value |
| Designer | Unconstrained Value |
| Net Price | Unconstrained Value |
| Railroaded | Unconstrained Value |
| Warranty | Unconstrained Value |
| Parent Company | Unconstrained Value |
| Tile or Sheet | Unconstrained Value |
| Standard Size | Unconstrained Value |
| Gauge | Unconstrained Value |
| Backing | Unconstrained Value |
| Reversible | Unconstrained Value |
| Discontinued | Unconstrained Value |
| Weight | Unconstrained Value |
| Physical Properties | Unconstrained Value |
| Colorfastness | Unconstrained Value |
| Minimum Order | Unconstrained Value |
| Lead Time | Unconstrained Value |
| Flame Spread Factor | Unconstrained Value |
| Smoke Devel. Factor | Unconstrained Value |
| Washable Temp. | Unconstrained Value |
| Alternate Basecloth | Unconstrained Value |
| Correlate Patterns | Unconstrained Value |
| Pile Height | Unconstrained Value |
| Associated Marketing | Unconstrained Value |

The selected product types 502, categories 1804 and choices 1806 preferably are transmitted to the server Web site 12, and a search is performed using the database server 15 and one or more of the databases 16. The search preferably is an "OR" search, to retrieve patterns for the selected product type 502 that match any of the categories 1804 or choices 1806. The match indicator 702 (FIG. 7) may be used to indicate the percentage of the attributes that are matched, so that the designer may determine how closely a given pattern matches all of the search criteria. A special indicator also may be provided to indicate that all attributes have been matched, i.e. that the pattern satisfies an "AND" search.

Detailed Implementation

A detailed implementation of an embodiment of the present invention now will be provided in connection with FIGS. 20-34. This detailed implementation will refer back to the overall description and intermediate level description of FIGS. 1–19.

Figure 20:
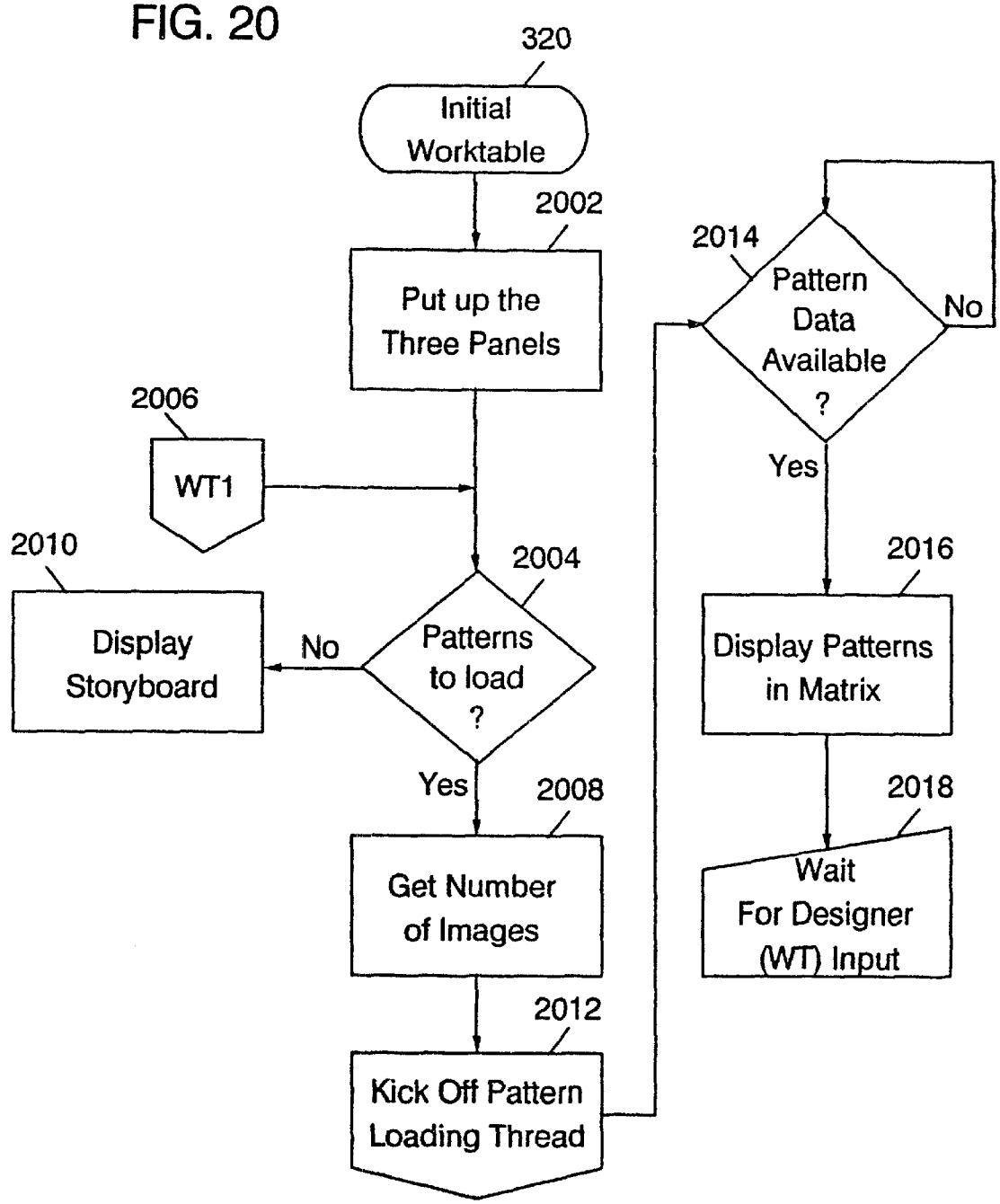
FIG. 20 is a flowchart of operations for producing an initial worktable according to an embodiment of the present invention.

Referring now to FIG. 20, operations for producing an initial worktable (WT) 320 of FIG. 5 now will be described. As shown in FIG. 20, operations begin at Block 2002, wherein the three panels of the worktable 320 are displayed. A saved worktable WT1 (Block 2006) then may be loaded. Details of Block 2006 will be described in FIG. 31 below. A test is then made at Block 2004 as to whether there are patterns to be loaded. If not, then the storyboard 326 is displayed at Block 2010. If yes, the images are obtained at Block 2008, by initiating a pattern loading thread at Block 2012. The pattern loading thread will be described in FIG. 21 below. Operations then wait at Block 2014 until pattern data is available. When pattern data is available, the patterns are displayed in the matrix 322 at Block 2016 and operations then wait for designer worktable input at Block 2018.

Figure 21:
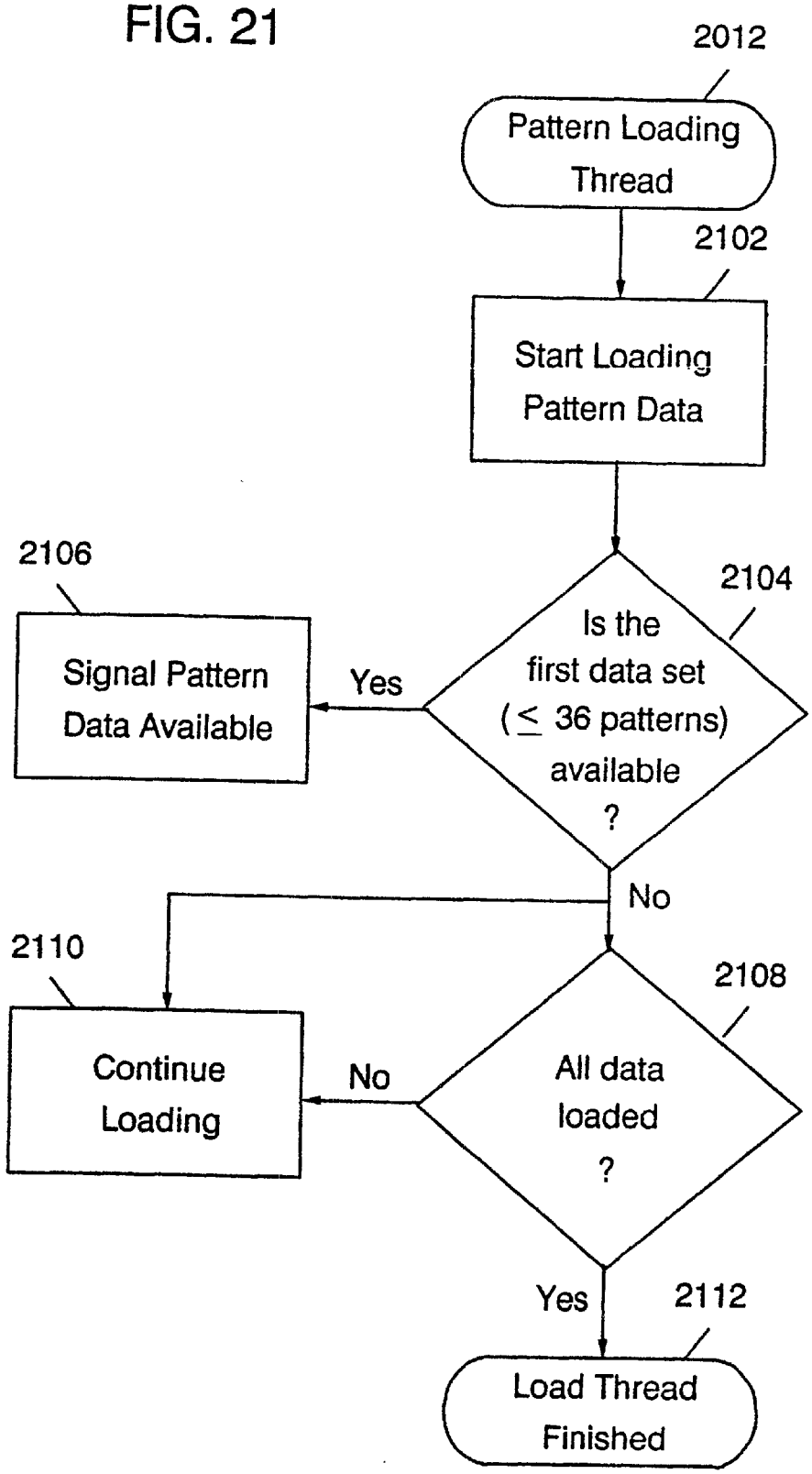
FIG. 21 is a flowchart of operations for pattern loading according to an embodiment of the present invention.

Referring now to FIG. 21, the pattern loading thread 2012 of FIG. 20 now will be described. The operations of FIG. 21 preferably take place at the server Web site 12. As shown in Block 2102, loading of pattern data is started. At Block 2104, a test is made as to whether the first data set, for example 36 patterns or less, is available. If yes, then at Block 2106, an indication is provided to the interior designer system 18 that pattern data is available, and the pattern data may be transmitted from the server Web site 12 to the interior designer system 18 via a network, such as the Internet 20. Since these patterns may occupy a large bandwidth, pattern transmission can begin even prior to completion of the search. If the answer at Block 2104 is no, at Block 2108, a test is made as to whether all data has been loaded and, if not, loading is continued at Block 2110 until all data has been loaded at Block 2112.

Figure 22:
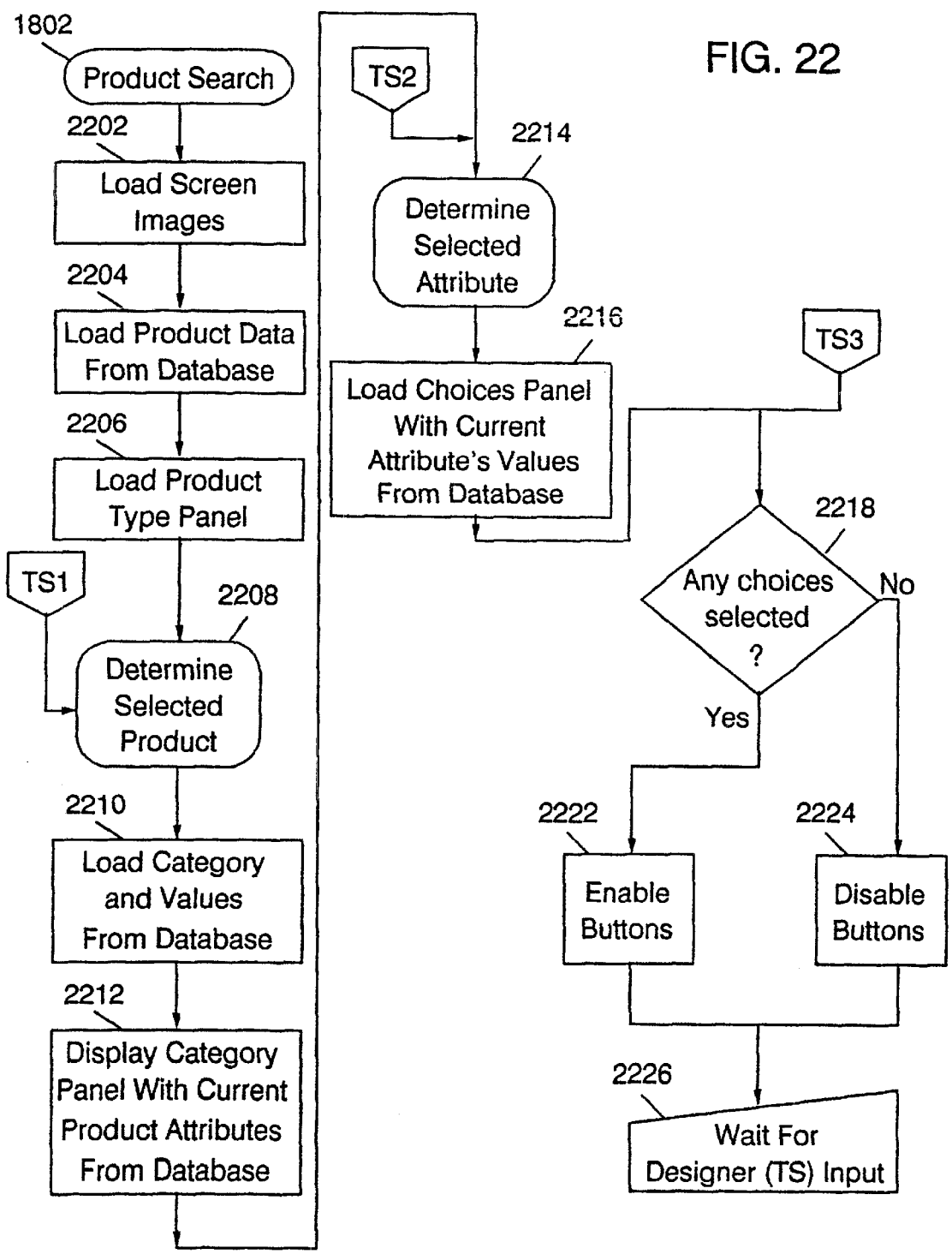
FIG. 22 is a flowchart of operations on a worktable to perform a product search according to an embodiment of the present invention.

Referring now to FIG. 22, detailed operations for performing a product search 1802 of FIG. 18, also referred to as a "text search", now will be described. In particular, at Block 2202, the screen images of FIG. 18 are loaded. Then, product data is loaded from the database 16 at Block 2204. The product type panel 502 also is loaded at Block 2206. A text search input (TS1) is received, and the selected product is determined from the input at Block 2208. Details of the text search input TS1 will be described in FIG. 23A below. The category and values that are loaded from the database 16 at Block 2210 and the category panel 1804 is displayed with current product attributes from the database at Block 2212. At Block 2214, a second text search input (TS2) is obtained, as described in detail in FIG. 23B, and the selected attribute is determined. The choices panel 1806 then is loaded with the current attributes values from the database at Block 2216. A third text search input (TS3) then is determined, as described in detail in FIG. 23D, and it is determined at Block 2218 whether any choices are selected. If yes, then the buttons are enabled for searching at Block 2222, and if not, the buttons for searching are disabled at Block 2224. Additional search input is then waited for at Block 2226.

Figure 23A:
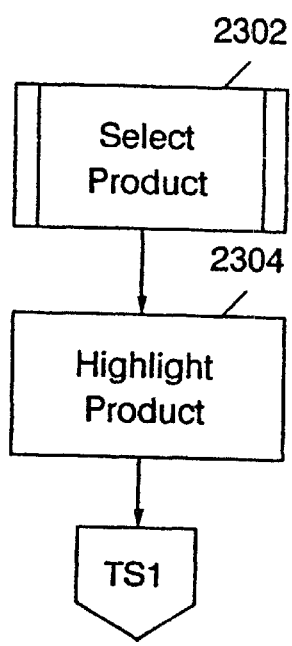
FIGS. 23A–23E are flowcharts of operations that are performed in response to designer text search input according to an embodiment of the present invention.
Figure 23B:
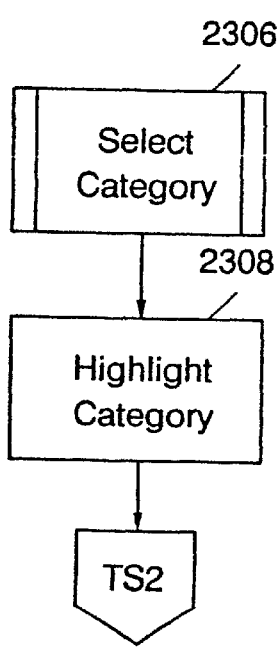
Figure 23C:
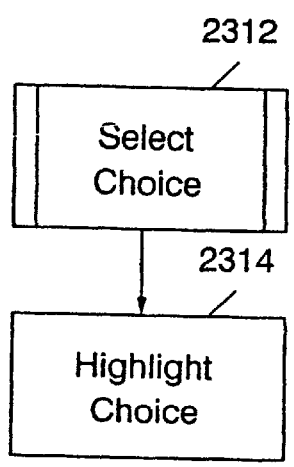
Figure 23D:
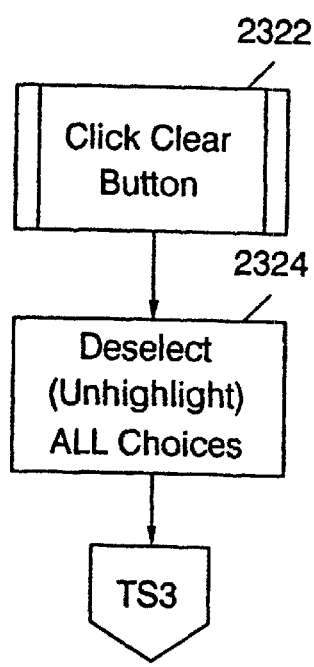
Figure 23E:
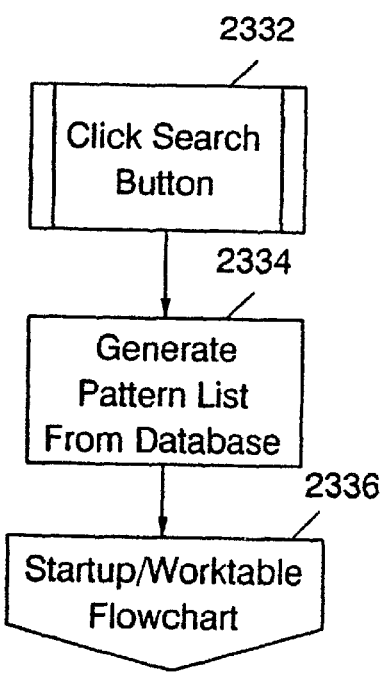

The designer inputs for the text search of FIG. 22 are illustrated in FIGS. 23A–23E. As illustrated in FIG. 23A, when the designer selects a product type 502 at Block 2302, the product type is highlighted at Block 2304. In FIG. 23B, when the designer selects a product category 1804 at Block 2306, the category is highlighted at Block 2308. In FIG. 23C, when the designer selects a choice 1806 at Block 2312, the choice is highlighted at Block 2314. In FIG. 23D, when the designer clicks the clear button 1902 of FIG. 19, at Block 2322, all choices are deselected at Block 2324. Finally, in FIG. 23E, when the designer clicks the search button 1904 of FIG. 19 at Block 2332, a pattern list is generated from the database at Block 2334 and the initial worktable flowchart of FIG. 20 may be invoked at Block 2336.

Figure 24A:
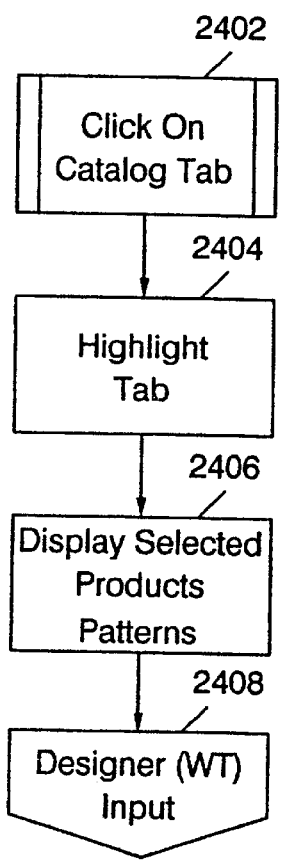
FIGS. 24A–24E are flowcharts of operations that are performed in response to designer inputs for tabs and buttons on a worktable, according to an embodiment of the present invention.
Figure 24B:
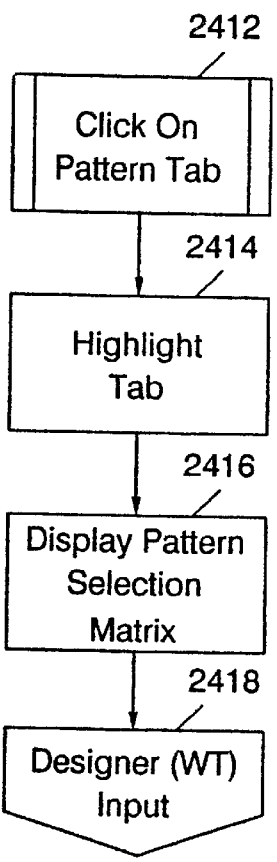
Figure 24C:
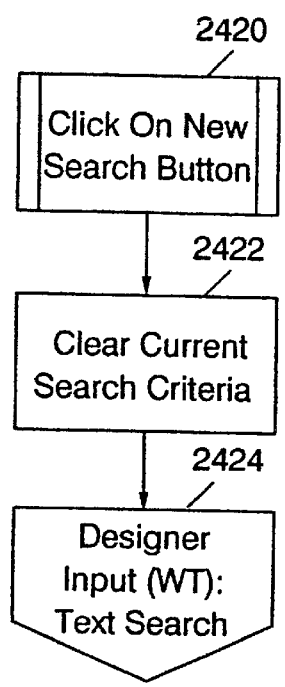
Figure 24D:
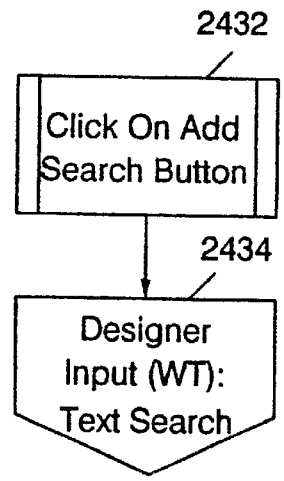

Referring now to FIGS. 24A–24E, operations for various designer inputs on the worktable screen (FIG. 5) now will be described. As shown in FIG. 24A, when a catalog tab 502 is selected at Block 2402, the tab is highlighted at Block 2404, and the selected product patterns 324 are displayed at Block 2406. Processing then waits for additional designer worktable input at Block 2408. As shown in FIG. 24B, when a pattern tab 322 is selected, the tab is highlighted at Block 2414 and the pattern selection matrix is displayed at Block 2416. Processing then waits for additional designer worktable input at Block 2418. At FIG. 24C, when the new search button 504b is selected at Block 2420, the current search criteria is cleared and operations then wait for designer input for a text search (FIG. 22). Similarly, at FIG. 24D, when the add search button (504a) of FIG. 5 is selected at Block 2432, then operations continue with designer worktable input of FIG. 22.

Figure 24E:
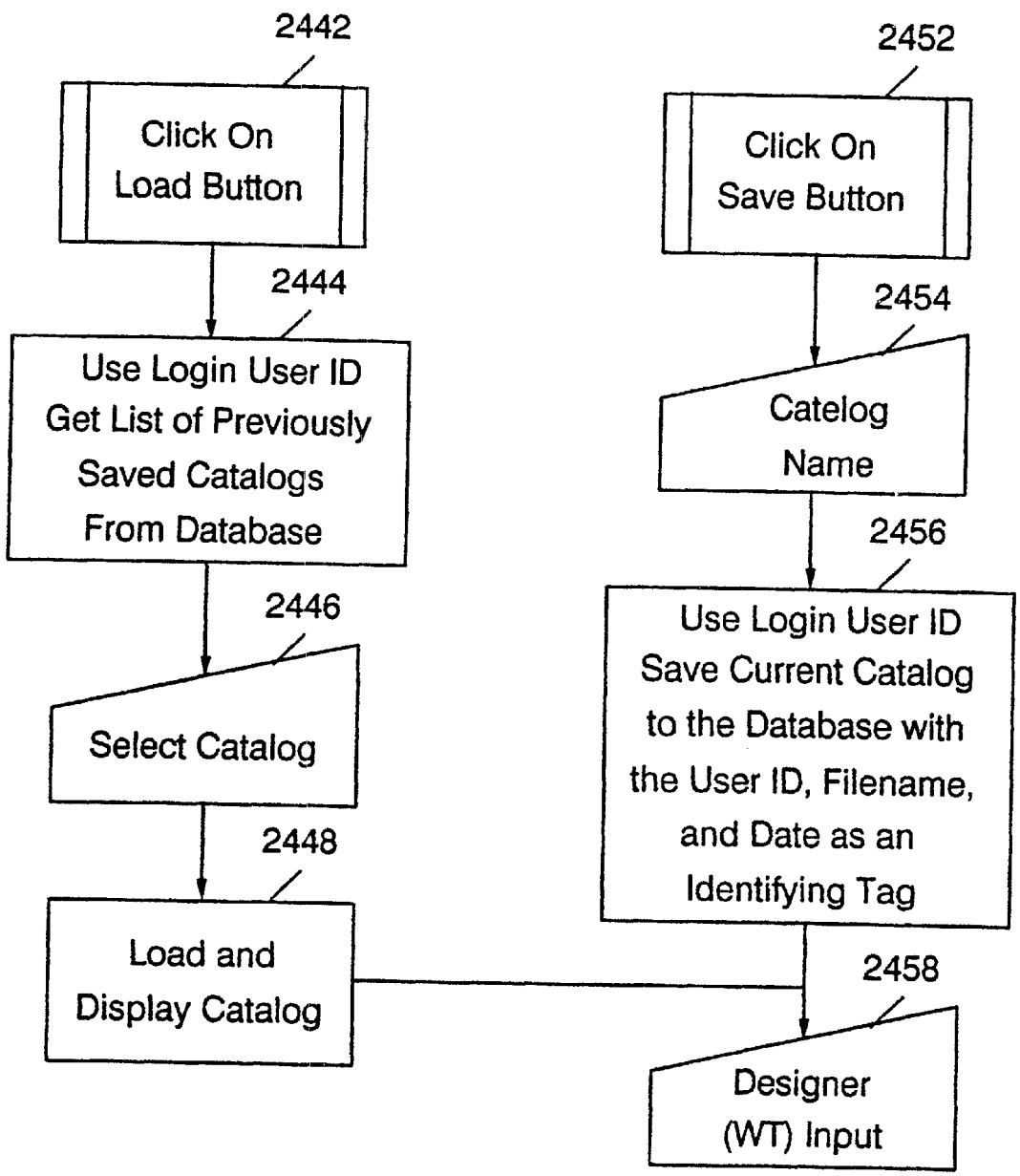

In FIG. 24E, when the designer clicks on the load button 1106, at Block 2442, the login user ID is used to get a list of previously saved catalogs from the Web site 12 at Block 2444. User input is accepted to select the catalog at Block 2446, and the catalog is loaded and displayed at Block 2448. Finally, when the save button 1102 is selected at Block 2452 and the storyboard name is input at Block 2454, the login user ID is used to save the current catalog to the database 16 with the user ID, file name and date as an identifying tag at Block 2456. Operations then wait for additional designer worktable input at Block 2458.

Figure 25:
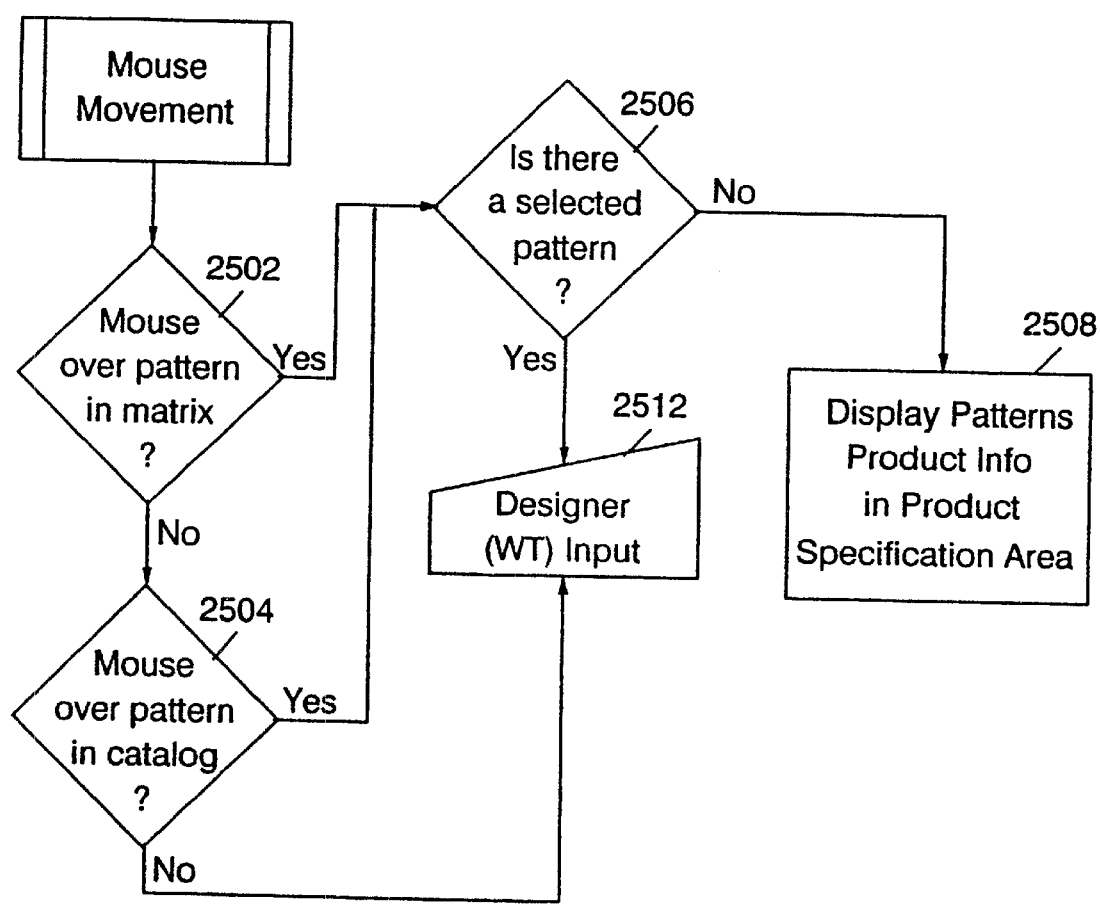
FIG. 25 is a flowchart of operations that are performed in response to designer mouse movement on a worktable according to an embodiment of the present invention.

FIG. 25 illustrates detailed operations for designer mouse movement on the worktable of FIG. 5. As shown in FIG. 25, if the mouse pointer is over a pattern in the matrix 322 (Block 2502), then a determination is made at Block 2506 as to whether there is a selected pattern. If not, then at Block 2508, the pattern's product information is displayed in the product specification area 328. If yes, operations wait for additional designer worktable input at Block 2512. Alternatively, if the mouse pointer is not over the pattern in the matrix at Block 2502, then a test is made at Block 2504 as to whether the mouse pointer is over a pattern in the catalog 324. If not, operations wait at Block 2512 for additional designer worktable input, and if yes, operations continue at Block 2506 as described above.

Figure 26:
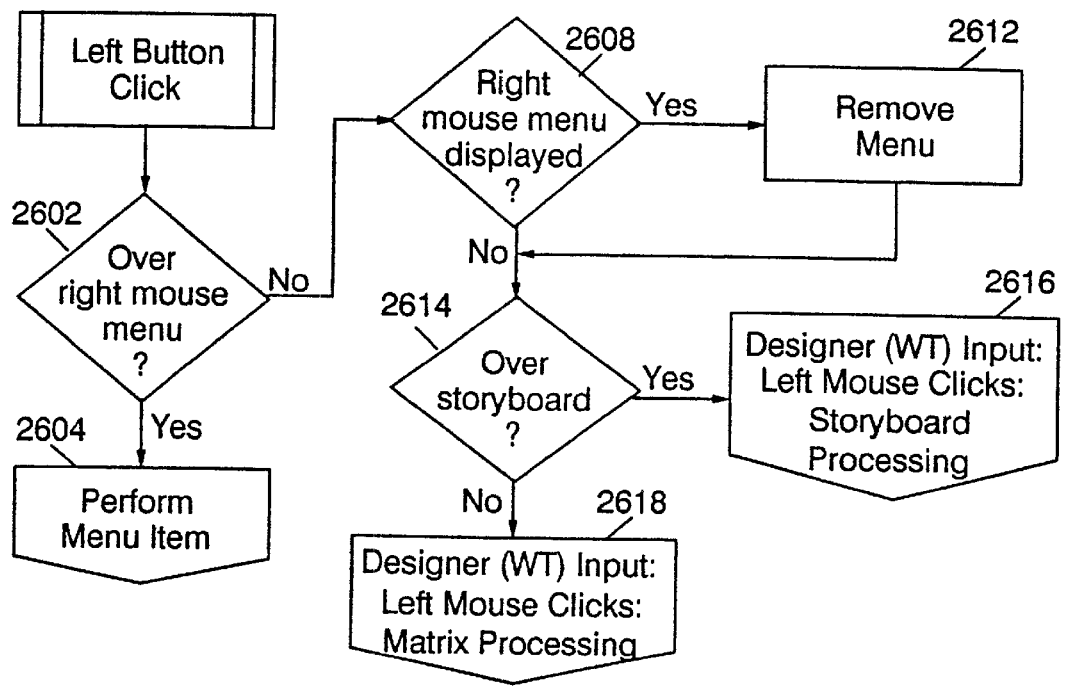
FIGS. 26 and 27 are flowcharts of operations performed in response to designer left mouse clicks that are not on tabs or buttons on a worktable according to an embodiment of the present invention.

FIG. 26 describes detailed operations for designer left mouse button clicks when on the worktable 320. As shown in FIG. 26, if the mouse pointer is over the right mouse menu (Block 2602), then the menu item is performed at Block 2604. If not, and the right mouse menu is displayed at Block 2608, then the menu item is removed at Block 2612. If not, and the mouse pointer is over the storyboard at Block 2614, then operations wait for designer worktable input at Block 2616. In particular, left mouse clicks can begin storyboard processing. If the mouse pointer is not over the storyboard, then operations wait for designer input at Block 2618, where left mouse clicks can indicate matrix processing.

Figure 27:
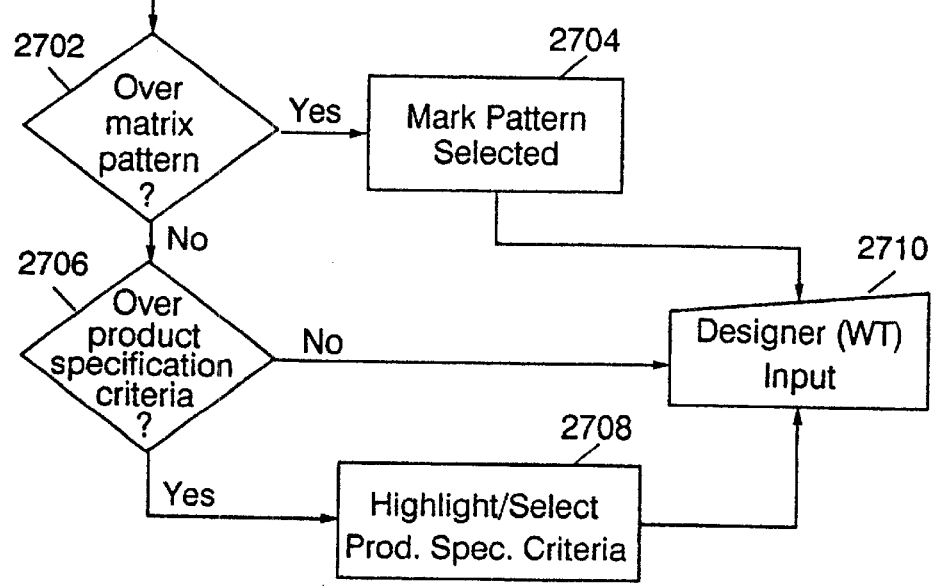

Matrix processing 2618 of FIG. 26 is described in FIG. 27. As shown, if the mouse pointer is over the matrix pattern at Block 2702, and the matrix pattern is selected by left click at Block 2704, then designer worktable input is accepted at Block 2710. If the mouse pointer is not over the matrix pattern at Block 2702, but is over the product specification window at Block 2706, then the selected product specification criteria is highlighted at Block 2708 and operations wait for additional designer worktable input at Block 2710.

Figure 28:
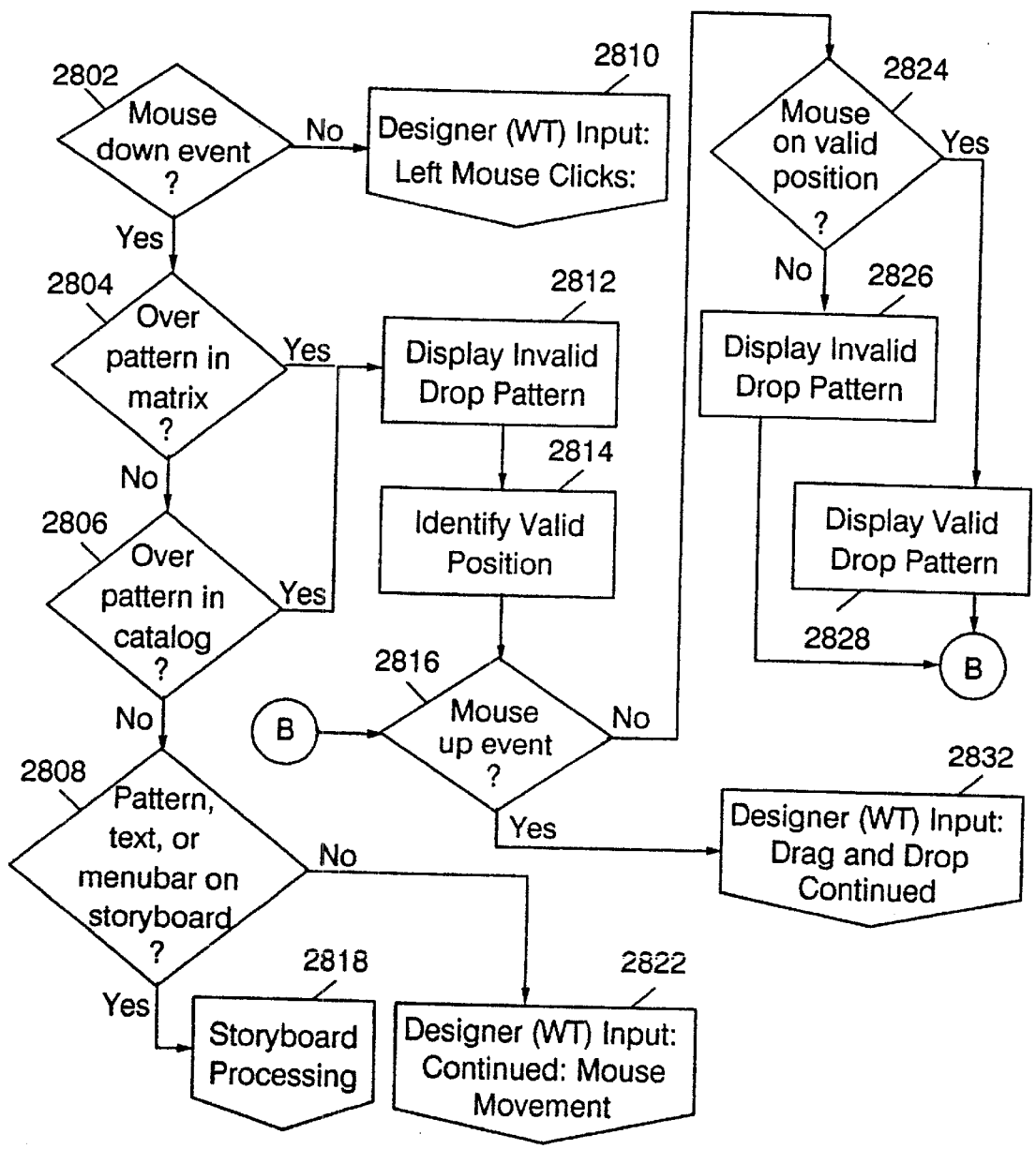
FIGS. 28 and 29 are flowcharts of operations performed in response to designer drag and drop inputs on a worktable according to an embodiment of the present invention.

Referring now to FIG. 28, drag and drop operations that are performed when the worktable of FIG. 5 is displayed, now will be described. As shown in FIG. 28, when a mouse down event does not occur at Block 2802, operations wait for designer worktable input of left mouse clicks of FIG. 26 or 27 at Block 2810. When a mouse down event does occur at Block 2802, a test is made as to whether the mouse pointer is over a pattern in the matrix 322 (Block 2804) or over a pattern in the catalog 324 (Block 2806) or whether the mouse pointer is on the pattern, text or menu bar of the storyboard 326 at Block 2808. If the mouse pointer is over the pattern in the matrix at Block 2804, then an invalid drop pattern warning is displayed at Block 2812 and a valid position is identified at Block 2814. Operations then wait for a mouse up event at Block 2816. Similar processing may occur when the mouse pointer is over the pattern in the catalog at Block 2806.

If the mouse pointer is over the pattern, text or menu bar on the storyboard at Block 2808, then storyboard processing is performed as will be described below. If the mouse pointer is not on a pattern, text or menu bar on the storyboard at Block 2808, then operations continue at Block 2822 for designer worktable input for mouse movement (FIG. 25). On occurrence of a mouse up event at Block 2816, operations continue at Block 2832 for drag and drop of FIG. 29. Finally, if the mouse pointer is on a valid position at Block 2824, then a valid drop pattern is displayed at Block 2828. If not, an invalid drop pattern is displayed at Block 2826.

Figure 29:
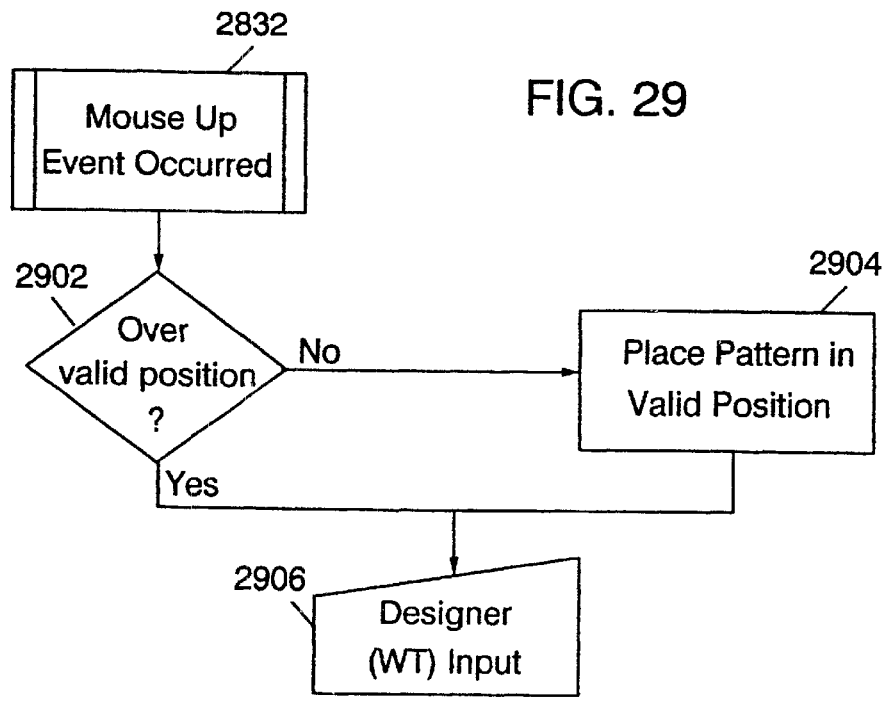

Referring now to FIG. 29, when a mouse up event occurs (Block 2832 of FIG. 28), then a test is made at Block 2902 as to whether the mouse pointer is over a valid position. If not, then the pattern is placed in the valid position at Block 2904. If yes, then user input is obtained at Block 2906.

Figure 30:
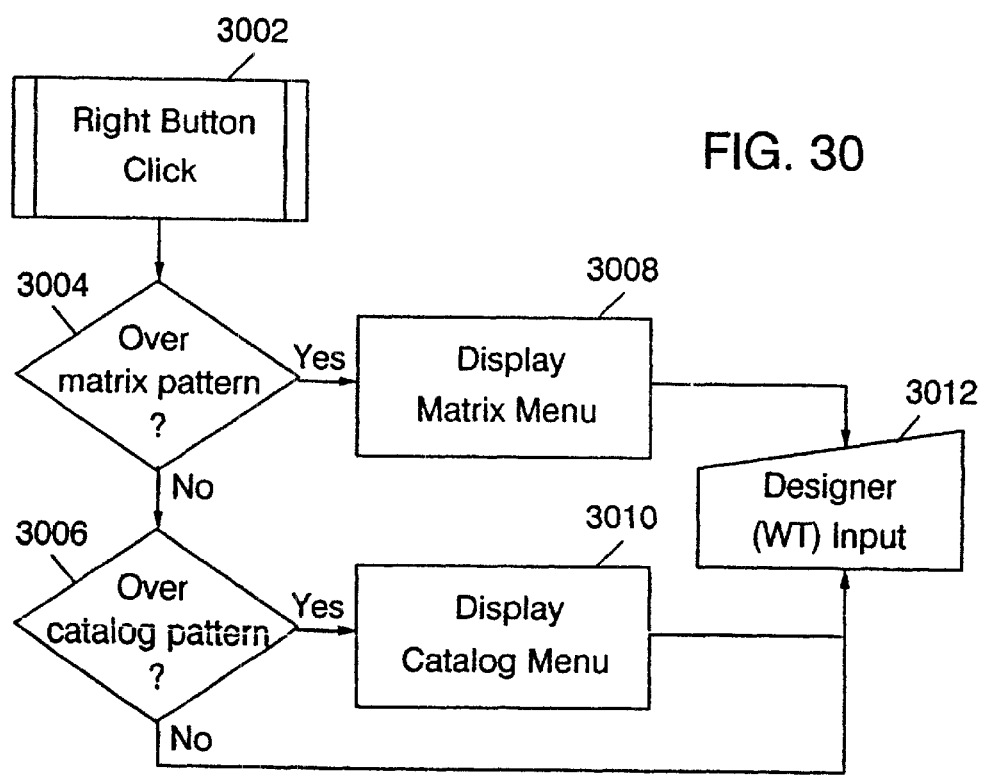
FIG. 30 is a flowchart of operations that are performed in response to a right mouse click by a designer on a worktable according to an embodiment of the present invention.

Referring now to FIG. 30, operations for processing designer worktable inputs when the right mouse button is clicked and the mouse pointer is not on tabs or buttons, will be described. As shown in FIG. 30, upon a right button click at Block 3002, a test is made as to whether the mouse pointer is over the matrix pattern 322 (Block 3004) or over the catalog pattern 324 (Block 3006). If over the matrix pattern, then the matrix menu is displayed at Block 3008. If over the catalog pattern (Block 3006), then the catalog menu is displayed at Block 3010. Operations then wait for additional designer worktable input at Block 3012.

Figure 31:
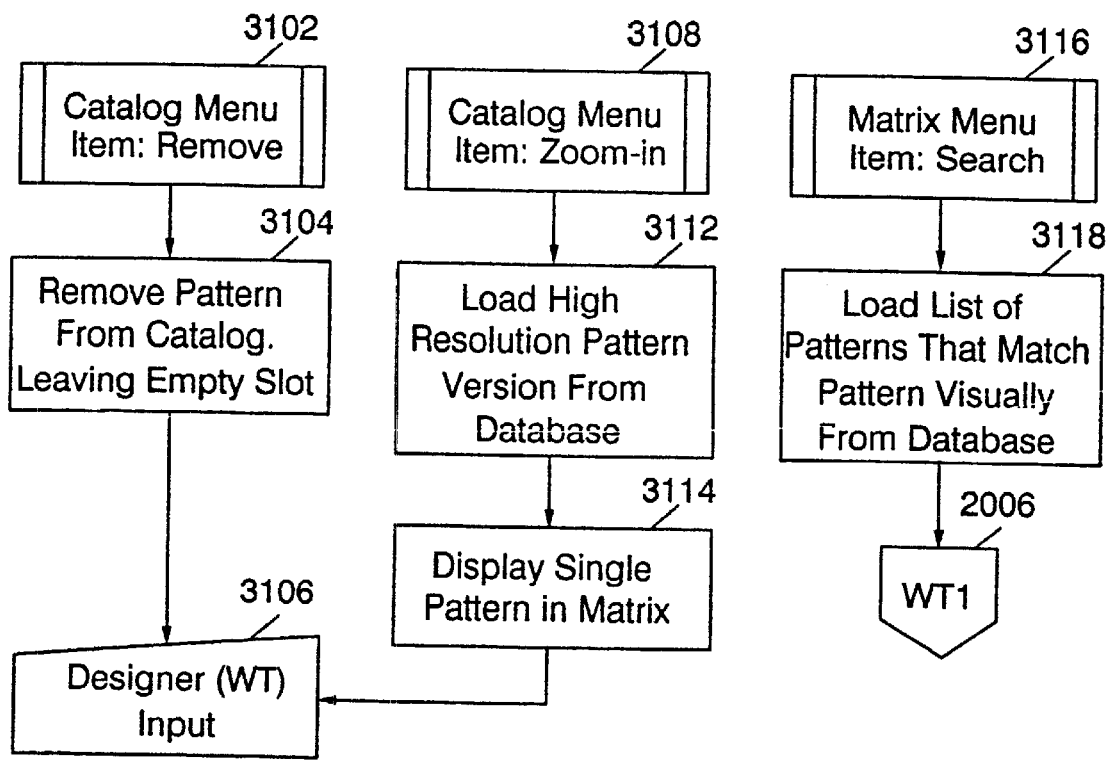
FIG. 31 is a flowchart of operations that are performed in response to designer input selection on a worktable of a menu item according to an embodiment of the present invention.

FIG. 31 describes operations for the worktable screen 320, to perform menu items. In particular, when the remove item 1302 of FIG. 13A is selected at Block 3102, the pattern is removed from the catalog 324, leaving an empty slot, at Block 3104, and designer worktable input is awaited at Block 3106. When the zoom-in menu 802 of FIG. 8 is selected at Block 3108, the high resolution pattern version is loaded from the database at Block 3112 and the single pattern is displayed in the matrix 322 at Block 3114. When a search menu item 804 of FIG. 8 is selected at Block 3116, then a list of patterns that visually match the selected pattern is loaded from the database 16 at Block 3118. Additional operations then continue at Block 2006 of FIG. 20.

Figure 33:
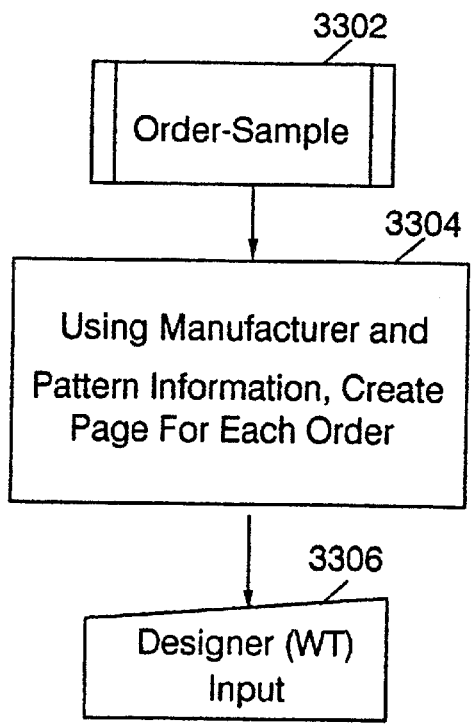
FIGS. 32 and 33 are flowcharts of operations that are performed in response to selection of options on a menu bar of a storyboard according to an embodiment of the present invention.
Figure 32:
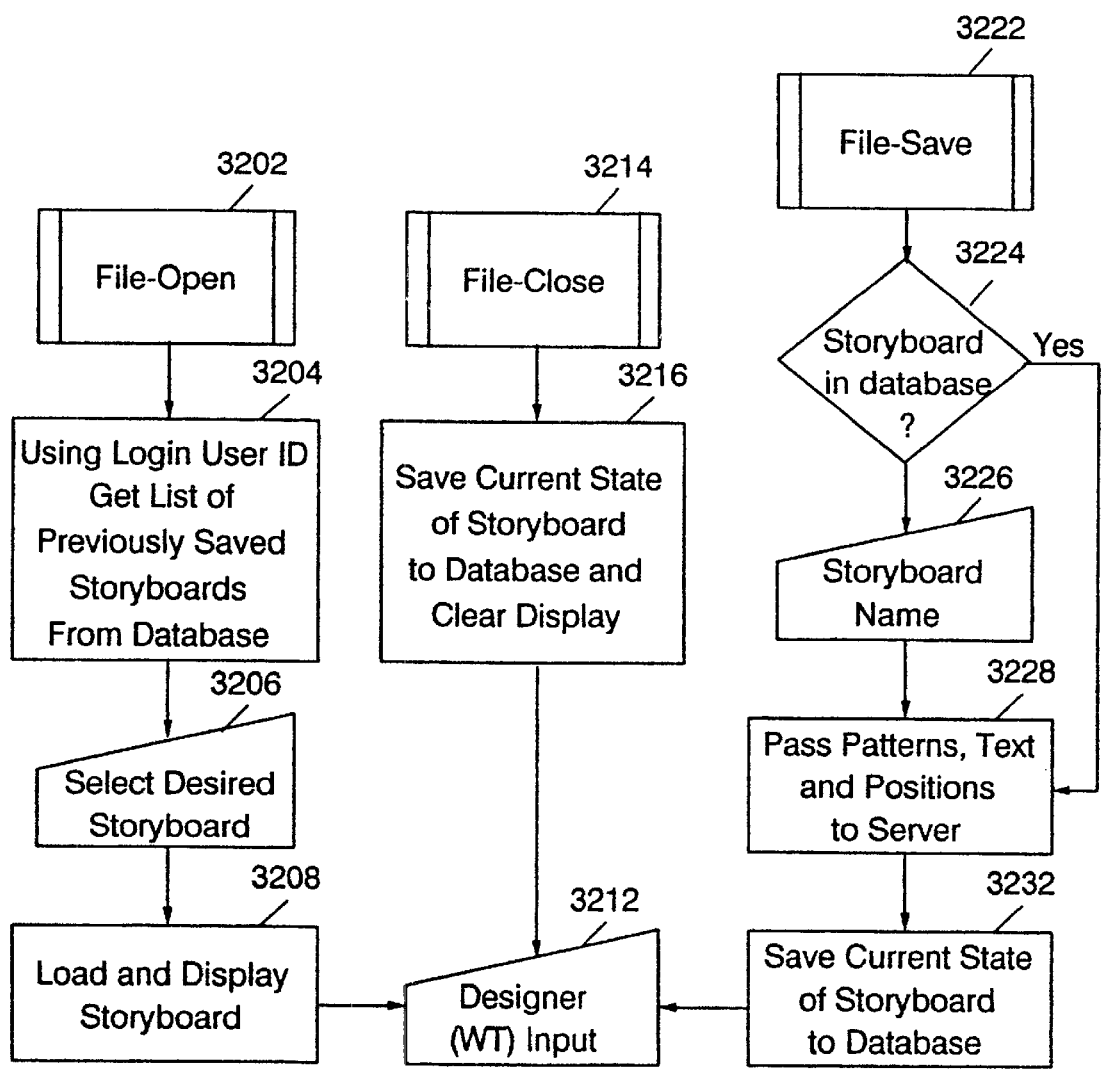
Figure 34:
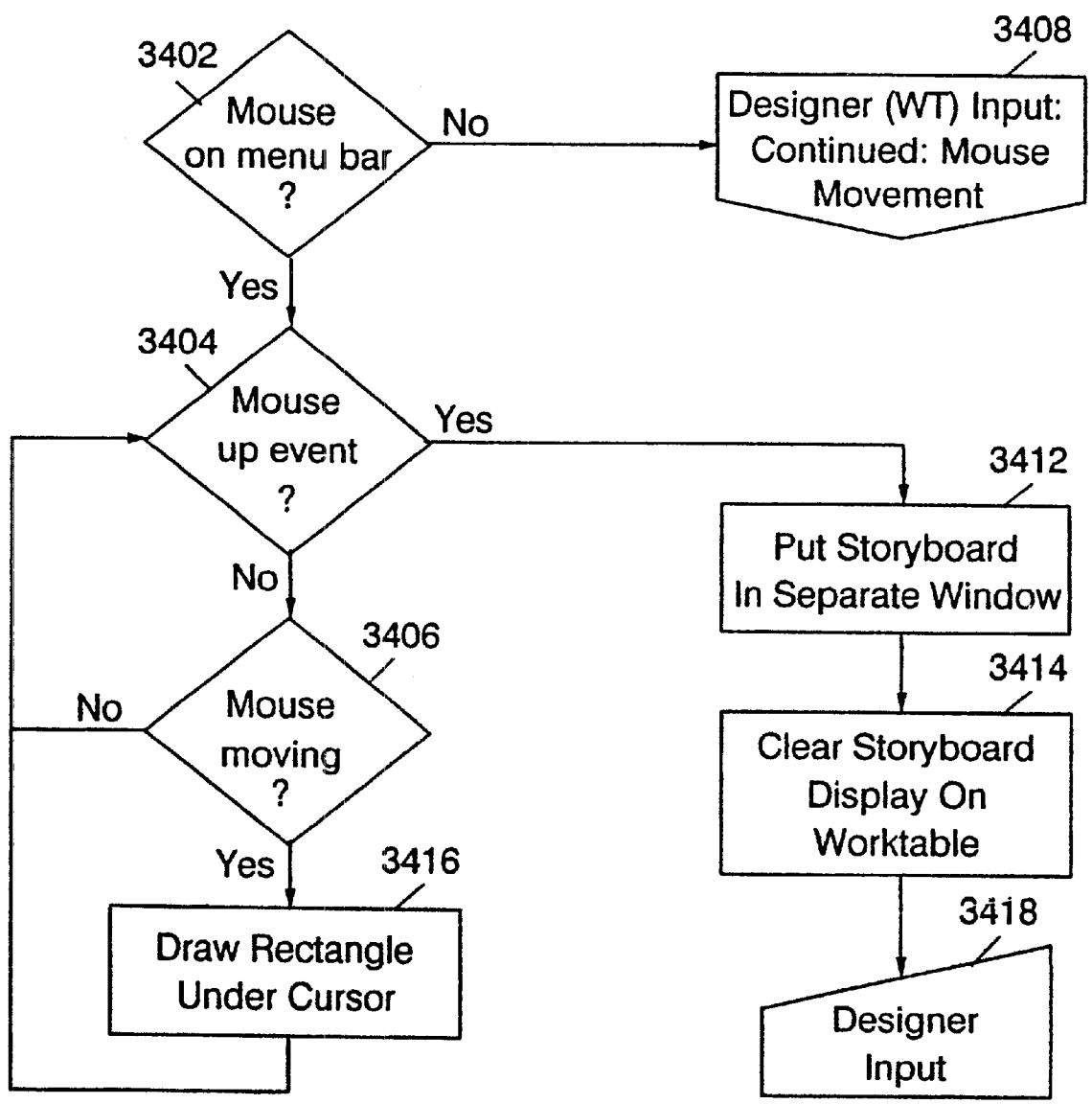
FIG. 34 is a flowchart of operations in response to designer drag and drop inputs for storyboard processing according to an embodiment of the present invention.

Referring to FIGS. 32–34, operations for processing designer inputs when on the storyboard screen 326 of FIG. 15, now will be described. As can be seen from FIG. 15, the storyboard screen includes a menu bar 1520 with three options: File, Edit and Order. As shown in FIG. 32, when File is accessed and an Open option is selected at Block 3202, the login user ID is used to get a list of previously saved stored storyboards from the database 16 at Block 3204. Then, referring to Block 3206, user input is obtained to select the desired storyboard, and at Block 3208, the desired storyboard is loaded and displayed. Operations then wait for additional designer worktable input at Block 3212.

When the File Close option is selected at Block 3214, then the current state of the storyboard is saved to the database 16 and the display is cleared at Block 3216. Additional input then is awaited at Block 3212. When the File Save option is selected at Block 3212, a test is made as to whether the storyboard already is saved at Block 3224. If not, then a storyboard name is obtained from the user at Block 3226, and then at Block 3228, the patterns, text and positions are passed to the database server 15. The current state of the storyboard then is saved to the database 16 at Block 3232. FIG. 33 illustrates operations when the Order option is selected (Block 3302) from the menu bar 1520 of the storyboard 326 of FIG. 15. As shown at Block 3304, using the manufacturer and pattern information, an HTML page may be created for each manufacturer and a sample may thereby be ordered. Additional designer input then is awaited at Block 3306.

Finally, referring to FIG. 34, drag and drop processing while on the storyboard 326 of FIG. 15 now will be described. In order to perform drag and drop processing, tests are made as to whether the mouse pointer is on the menu bar 1520 of the storyboard (Block 3402), whether a mouse up event has occurred (Block 3404), and whether the mouse pointer is moving (Block 3406). If the mouse pointer is not on the menu bar 1520 at Block 3402, then operations continue for designer worktable input for mouse pointer movement at Block 3408, corresponding to FIG. 25. If a mouse up event has occurred at Block 3404, then the storyboard is placed in a separate window at Block 3412, as shown in FIG. 16. The storyboard display on the worktable then also is cleared at Block 3414, as also shown in FIG. 16. This window then may be resized as shown in FIG. 17. Operations then wait for designer input at Block 3418. Accordingly, the storyboard may be separated from the worktable and enlarged using the operations of FIG. 34.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of generating a storyboard of interior design surface treatments for an interior space, comprising the following steps that are performed on a computer system:
    displaying a plurality of arrays of patterns that correspond to user search criteria, from a stored set of patterns for interior design surface treatments, each array of patterns corresponding to a surface treatment product type;
    generating a plurality of subarrays of patterns, each subarray corresponding to a surface treatment product type, in response to user selection from the corresponding array of patterns for the corresponding surface treatment type; and
    combining at least one pattern from at least two of the subarrays of patterns to produce a storyboard of interior design surface treatments for an interior space.

2. A method according to claim 1 wherein the step of displaying is preceded by the step of:
    storing a set of patterns for interior design surface treatments.

3. A method according to claim 2 wherein the storing step comprises the step of storing a set of patterns for interior design surface treatments, each pattern including a plurality of pattern attributes.

4. A method according to claim 3 wherein the following steps are performed between the step of storing and the step of displaying:
    accepting at least one user selected attribute for at least one of the surface treatment product types to define the user search criteria; and
    searching the stored pattern attributes for the at least one of the surface treatment product types to generate at least one of the plurality of arrays of patterns that meet the user search criteria.

5. A method according to claim 4 wherein the displaying step further comprises the step of displaying with each pattern an indicator of an extent that the pattern matches the user search criteria.

6. A method according to claim 1 wherein the surface treatment product types comprise at least one of floor treatments, wall treatments, fabrics and countertop materials.

7. A method according to claim 1 wherein the surface treatment product types comprise at least one of tile floor treatments, carpet floor treatments and carpet floor treatments.

8. A method according to claim 1 wherein the pattern attributes include at least one of an identification of a manufacturer, an identification of a primary color and an identification of an overall style.

9. A method according to claim 1 wherein the following step is performed between the steps of generating and combining:
    displaying the plurality of subarrays of patterns to create a catalog.

10. A method according to claim 1 wherein the combining step is followed by the step of displaying the storyboard of interior design surface treatments for the interior space.

11. A method according to claim 10 wherein the displaying step is followed by the step of:
    annotating the storyboard of interior design surface treatments for the interior space in response to user input.

12. A method according to claim 10 wherein the displaying step is followed by the step of:
    emailing the storyboard of interior design surface treatments for the interior space.

13. A method according to claim 10 wherein the displaying step is followed by the step of:
    electronically ordering samples of the interior design surface treatments that are contained in the storyboard.

14. A method according to claim 10 wherein the displaying step is followed by the step of:
    electronically ordering sufficient quantities of the interior design surface treatments that are contained in the storyboard for the interior space.

15. A method according to claim 9 wherein the step of displaying a plurality of arrays of patterns is performed in a first window on a display and wherein the step of displaying the plurality of subarrays of patterns is performed in a second window on the display.

16. A method according to claim 15 wherein the combining step is followed by the step of displaying the storyboard in a third window on the display.

17. A method according to claim 4 wherein the steps of displaying and combining are performed on a client that is connected to a server via a network and wherein the steps of storing and searching are performed on the server.

18. A method of generating a storyboard of interior design surface treatments for an interior space, comprising the following steps that are performed on a computer system:
    displaying a plurality of arrays of patterns that correspond to user search criteria, from a stored set of patterns for interior design surface treatments, each array of patterns corresponding to a surface treatment product type; and
    combining at least one pattern from at least two of the arrays of patterns to produce a storyboard of interior design surface treatments for an interior space.

19. A method according to claim 18 wherein the step of displaying is preceded by the step of:
    storing a set of patterns for interior design surface treatments.

20. A method according to claim 19 wherein the storing step comprises the step of storing a set of patterns for interior design surface treatments, each pattern including a plurality of pattern attributes.

21. A method according to claim 20 wherein the following steps are performed between the step of storing and the step of displaying:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

22. A method according to claim 21 wherein the displaying step further comprises the step of displaying with each pattern an indicator of an extent that the pattern matches the user search criteria.

23. A method according to claim 18 wherein the surface treatment product types comprise at least one of floor treatments, wall treatments, fabrics and countertop materials.

24. A method according to claim 18 wherein the surface treatment product types comprise at least one of tile floor treatments, carpet floor treatments and carpet floor treatments.

25. A method according to claim 18 wherein the pattern attributes include at least one of an identification of a manufacturer, an identification of a primary color and an identification of an overall style.

26. A method according to claim 18 wherein the combining step is followed by the step of displaying the storyboard of interior design surface treatments for the interior space.

27. A method according to claim 26 wherein the displaying step is followed by the step of:

annotating the storyboard of interior design surface treatments for the interior space in response to user input.

28. A method according to claim 26 wherein the displaying step is followed by the step of:

emailing the storyboard of interior design surface treatments for the interior space.

29. A method according to claim 26 wherein the displaying step is followed by the step of:

electronically ordering samples of the interior design surface treatments that are contained in the storyboard.

30. A method according to claim 26 wherein the displaying step is followed by the step of:

electronically ordering sufficient quantities of the interior design surface treatments that are contained in the storyboard for the interior space.

31. A method according to claim 26 wherein the step of displaying a plurality of arrays of patterns is performed in a first window on a display and wherein the step of displaying the storyboard is performed in a second window on the display.

32. A method according to claim 21 wherein the steps of displaying and combining are performed on a client that is connected to a server via a network and wherein the steps of storing and searching are performed on the server.

33. A method of generating a storyboard of interior design surface treatments for an interior space, comprising the following steps that are performed on a computer system:

displaying in a first window on a display, a plurality of arrays of patterns that correspond to user search criteria, from a stored set of patterns for interior design surface treatments, each array of patterns corresponding to a surface treatment product type;

displaying in a second window on the display a plurality of subarrays of patterns, each subarray corresponding to a surface treatment product type, in response to user selection from the corresponding array of patterns for the corresponding surface treatment type that is displayed in the first window; and displaying in a third window on the display, at least one pattern from at least two of the subarrays of patterns in the second window, to produce a storyboard of interior design surface treatments for an interior space.

34. A method according to claim 33 wherein the step of displaying in a first window is preceded by the step of:

storing a set of patterns for interior design surface treatments.

35. A method according to claim 34 wherein the storing step comprises the step of storing a set of patterns for interior design surface treatments, each pattern including a plurality of pattern attributes.

36. A method according to claim 35 wherein the following steps are performed between the step of storing and the step of displaying in a first window:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

37. A method according to claim 36 wherein the step of displaying in a first window further comprises the step of displaying with each pattern in the first window an indicator of an extent that the pattern matches the user search criteria.

38. A method according to claim 33 wherein the step of displaying in a third window is followed by the step of:

annotating the storyboard of interior design surface treatments for the interior space in response to user input.

39. A method according to claim 33 wherein the step of displaying in a third window is followed by the step of:

emailing the storyboard of interior design surface treatments for the interior space.

40. A method according to claim 33 wherein the step of displaying in a third window is followed by the step of:

electronically ordering samples of the interior design surface treatments that are contained in the storyboard.

41. A method according to claim 33 wherein the step of displaying in a third window is followed by the step of:

electronically ordering sufficient quantities of the interior design surface treatments that are contained in the storyboard for the interior space.

42. A method according to claim 36 wherein the steps of displaying in a first window, displaying in a second window and displaying in a third window are performed on a client that is connected to a server via a network and wherein the steps of storing and searching are performed on the server.

43. A method of generating a storyboard of interior design surface treatments for an interior space, comprising the following steps that are performed on a computer system:

generating a plurality of arrays of patterns that correspond to user search criteria, from a stored set of patterns for interior design surface treatments, each array of patterns corresponding to a surface treatment product type;

generating a plurality of subarrays of patterns, each subarray corresponding to a surface treatment product type, in response to user selection from the corresponding array of patterns for the corresponding surface treatment type; and combining at least one pattern from at least two of the subarrays of patterns to produce a storyboard of interior design surface treatments for an interior space.

44. A method according to claim 43 wherein the step of generating a plurality of arrays is preceded by the step of:

storing a set of patterns for interior design surface treatments.

45. A method according to claim 44 wherein the storing step comprises the step of storing a set of patterns for interior design surface treatments, each pattern including a plurality of pattern attributes.

46. A method according to claim 45 wherein the following steps are performed between the step of storing and the step of generating a plurality of arrays:

accepting at least one user selected attribute for at least one of the surface treatment product types to define the user search criteria; and searching the stored pattern attributes for the at least one of the surface treatment product types to generate at least one of the plurality of arrays of patterns that meet the user search criteria.

47. A method according to claim 46 wherein the step of generating a plurality of arrays further comprises the step of generating for each pattern, an indicator of an extent that the pattern matches the user search criteria.

48. A method according to claim 43 wherein the combining step is followed by the step of:

annotating the storyboard of interior design surface treatments for the interior space in response to user input.

49. A method according to claim 43 wherein the combining step is followed by the step of:

emailng the storyboard of interior design surface treatments for the interior space.

50. A method according to claim 43 wherein the combining step is followed by the step of:

electronically ordering samples of the interior design surface treatments that are contained in the storyboard.

51. A method according to claim 43 wherein the combining step is followed by the step of:

electronically ordering sufficient quantities of the interior design surface treatments that are contained in the storyboard for the interior space.

52. A server method of generating a storyboard of interior design surface treatments for an interior space, comprising the following steps that are performed at a server that is connected to a client by a network:

storing a set of patterns for a plurality of surface treatment product types, each pattern including a plurality of pattern attributes;

accepting from the client over the network at least one user selected attribute for at least one of the surface treatment product types;

searching the stored pattern attributes for the at least one of the surface treatment product types to generate a plurality of arrays of patterns that meet the at least one user selected attribute;

transmitting the plurality of arrays of patterns that meet the at least one user selected attribute to the client over the network;

receiving from the client over the network a storyboard of interior design surface treatments for an interior space that represents at least one pattern from at least two of the arrays of patterns; and storing the received storyboard.

53. A method according to claim 52 wherein the searching step further comprises the step of generating for each pattern, an indicator of an extent that the pattern matches the user search criteria.

54. A client method of generating a storyboard of interior design surface treatments for an interior space, comprising the following steps that are performed at a client that is connected to a server by a network:

accepting at least one user selected attribute for at least one of a plurality of surface treatment product types to define a user search criteria;

transmitting the user search criteria to the server over the network;

receiving from the server over the network, a plurality of arrays of patterns that correspond to the user search criteria, each array of patterns corresponding to a surface treatment product type;

displaying the plurality of arrays of patterns;

accepting at least one user selection from at least one of the plurality of arrays of patterns;

generating a plurality of subarrays of patterns, each subarray corresponding to a surface treatment product type, in response to the at least one user selection from the corresponding array of patterns for the corresponding surface treatment type;

displaying the plurality of subarrays of patterns;

combining at least one pattern from at least two of the subarrays of patterns to produce a storyboard of interior design surface treatments for an interior space; and displaying the storyboard of interior design surface treatments for the interior space.

55. A method according to claim 54 wherein the step of displaying the plurality of arrays of patterns further comprises the step of displaying with each pattern an indicator of an extent that the pattern matches the user search criteria.

56. A method according to claim 54 wherein the step of displaying the storyboard is followed by the step of:

annotating the storyboard of interior design surface treatments for the interior space in response to user input.

57. A method according to claim 54 wherein the step of displaying the storyboard is followed by the step of:

emailing the storyboard of interior design surface treatments for the interior space.

58. A method according to claim 54 wherein the step of displaying the storyboard is followed by the step of:

electronically ordering samples of the interior design surface treatments that are contained in the storyboard.

59. A method according to claim 54 wherein the step of displaying the storyboard is followed by the step of:

electronically ordering sufficient quantities of the interior design surface treatments that are contained in the storyboard for the interior space.

60. A method according to claim 59 wherein the step of displaying the plurality of arrays of patterns is performed in a first window on a display and wherein the step of displaying the plurality of subarrays of patterns is performed in a second window on the display.

61. A method according to claim 60 wherein the step of displaying the storyboard is performed in a third window on the display.

62. A computer program product for generating a storyboard of interior design surface treatments for an interior space, the computer program product comprising a computer usable storage medium having computer readable program code embodied in the medium, the computer readable program code comprising:

computer readable program code that displays a plurality of arrays of patterns that correspond to user search criteria, from a stored set of patterns for interior design surface treatments, each array of patterns corresponding to a surface treatment product type;

computer readable program code that generates a plurality of subarrays of patterns, each subarray corresponding to a surface treatment product type, in response to user selection from the corresponding array of patterns for the corresponding surface treatment type; and computer readable program code that combines at least one pattern from at least two of the subarrays of patterns to produce a storyboard of interior design surface treatments for an interior space.

63. A computer program product according to claim 62 further comprising:

computer readable program code that stores a set of patterns for interior design surface treatments.

64. A computer program product according to claim 63 wherein the computer readable program code that stores comprises computer readable program code that stores a set of patterns for interior design surface treatments, each pattern including a plurality of pattern attributes.

65. A computer program product according to claim 64 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

66. A computer program product according to claim 65 wherein the computer readable program code that displays further comprises computer readable program code that displays with each pattern an indicator of an extent that the pattern matches the user search criteria.

67. A computer program product according to claim 62 further comprising:

computer readable program code that displays the plurality of subarrays of patterns to create a catalog.

68. A computer program product according to claim 62 further comprising:

computer readable program code that displays the storyboard of interior design surface treatments for the interior space.

69. A computer program product according to claim 68 further comprising:

computer readable program code that annotates the storyboard of interior design surface treatments for the interior space in response to user input.

70. A computer program product according to claim 68 further comprising:

computer readable program code that emails the storyboard of interior design surface treatments for the interior space.

71. A computer program product according to claim 68 further comprising:

computer readable program code that electronically orders samples of the interior design surface treatments that are contained in the storyboard.

72. A computer program product according to claim 68 further comprising:

computer readable program code that electronically orders sufficient quantities of the interior design surface treatments that are contained in the storyboard for the interior space.

73. A computer program product according to claim 67 wherein the computer readable program code displays a plurality of arrays of patterns in a first window on a display and wherein the computer readable program code displays the plurality of subarrays of patterns in a second window on the display.

74. A computer program product according to claim 73 further comprising:

computer readable program code that displays the storyboard in a third window on the display.

75. A computer program product according to claim 65 wherein the computer readable program code that displays and the computer readable program code that combines execute on a client that is connected to a server via a network and wherein the computer readable program code that stores and the computer readable program code that searches executes on the server.

76. A computer program product for generating a storyboard of interior design surface treatments for an interior space, the computer program product comprising a computer storage medium having computer readable program code embodied in the medium, the computer readable program code comprising:

computer readable program code that displays a plurality of arrays of patterns that correspond to user search criteria, from a stored set of patterns for interior design surface treatments, each array of patterns corresponding to a surface treatment product type; and computer readable program code that combines at least one pattern from at least two of the arrays of patterns to produce a storyboard of interior design surface treatments for an interior space.

77. A computer program product according to claim 76 further comprising:

computer readable program code that stores a set of patterns for interior design surface treatments.

78. A computer program product according to claim 77 wherein the computer readable program code that stores comprises computer readable program code that stores a set of patterns for interior design surface treatments, each pattern including a plurality of pattern attributes.

79. A computer program product according to claim 78 further comprising:

computer readable program code that accepts at least one user selected attribute for at least one of the surface treatment product types to define the user search criteria; and computer readable program code that searches the stored pattern attributes for the at least one of the surface treatment product types to generate at least one of the plurality of arrays of patterns that meet the user search criteria.

80. A computer program product according to claim 79 wherein the computer readable program code that displays further comprises computer readable program code that displays with each pattern an indicator of an. extent that the pattern matches the user search criteria.

81. A computer program product according to claim 76 further comprising:

computer readable program code that displays the storyboard of interior design surface treatments for the interior space.

82. A computer program product according to claim 81 further comprising:

computer readable program code that annotates the storyboard of interior design surface treatments for the interior space in response to user input.

83. A computer program product according to claim 81 further comprising:

computer readable program code that emails the storyboard of interior design surface treatments for the interior space.

84. A computer program product according to claim 81 further comprising:
computer readable program code that electronically orders samples of the interior design surface treatments that are contained in the storyboard.

85. A computer program product according to claim 81 further comprising:
computer readable program code that electronically orders sufficient quantities of the interior design surface treatments that are contained in the storyboard for the interior space.

86. A computer program product according to claim 81 wherein the computer readable program code displays a plurality of arrays of patterns in a first window on a display and wherein the computer readable program code displays the storyboard in a second window on the display.

87. A computer program product according to claim 79 wherein the computer readable program code that displays and the computer readable program code that combines execute on a client that is connected to a server via a network and wherein computer readable program code that stores and the computer readable program code that searches execute on the server.

88. A computer program product for generating a storyboard of interior design surface treatments for an interior space, the computer program product comprising a computer usable storage medium having computer readable program code embodied in the medium, the computer readable program code comprising:
computer readable program code that displays in a first window on a display, a plurality of arrays of patterns that correspond to user search criteria, from a stored set of patterns for interior design surface treatments, each array of patterns corresponding to a surface treatment product type;
computer readable program code that displays in a second window on the display a plurality of subarrays of patterns, each subarray corresponding to a surface treatment product type, in response to user selection from the corresponding array of patterns for the corresponding surface treatment type that is displayed in the first window; and
computer readable program code that displays in a third window on the display, at least one pattern from at least two of the subarrays of patterns in the second window, to produce a storyboard of interior design surface treatments for an interior space.

89. A computer program product according to claim 88 further comprising:
computer readable program code that stores a set of patterns for interior design surface treatments.

90. A computer program product according to claim 89 wherein the computer readable program code that stores comprises computer readable program code that stores a set of patterns for interior design surface treatments, each pattern including a plurality of pattern attributes.

91. A computer program product according to claim 90 further comprising:
computer readable program code that accepts at least one user selected attribute for at least one of the surface treatment product types to define the user search criteria; and
computer readable program code that searches the stored pattern attributes for the at least one of the surface treatment product types to generate at least one of the plurality of arrays of patterns that meet the user search criteria.

92. A computer program product according to claim 91 wherein the computer readable program code that displays in a first window further comprises computer readable program code that displays with each pattern in the first window an indicator of an extent that the pattern matches the user search criteria.

93. A computer program product according to claim 88 further comprising:
computer readable program code that annotates the storyboard of interior design surface treatments for the interior space in response to user input.

94. A computer program product according to claim 88 further comprising:
computer readable program code that emails the storyboard of interior design surface treatments for the interior space.

95. A computer program product according to claim 88 further comprising:
computer readable program code that electronically orders samples of the interior design surface treatments that are contained in the storyboard.

96. A computer program product according to claim 88 further comprising:
computer readable program code that electronically orders sufficient quantities of the interior design surface treatments that are contained in the storyboard for the interior space.

97. A computer program product according to claim 91 wherein the computer readable program code that displays in a first window, the computer readable program code that displays in a second window and the computer readable program code that displays in a third window execute on a client that is connected to a server via a network and wherein the computer readable program code that stores and the computer readable program code that searches execute on the server.

98. A computer program product for generating a storyboard of interior design surface treatments for an interior space, the computer program product comprising a computer usable storage medium having computer readable program code embodied in the medium, the computer readable program code comprising:
computer readable program code that generates a plurality of arrays of patterns that correspond to user search criteria, from a stored set of patterns for interior design surface treatments, each array of patterns corresponding to a surface treatment product type;
computer readable program code that generates a plurality of subarrays of patterns, each subarray corresponding to a surface treatment product type, in response to user selection from the corresponding array of patterns for the corresponding surface treatment type; and
computer readable program code that combines at least one pattern from at least two of the subarrays of patterns to produce a storyboard of interior design surface treatments for an interior space.

99. A computer program product according to claim 98 further comprising:
computer readable program code that stores a set of patterns for interior design surface treatments.

100. A computer program product according to claim 99 wherein the computer readable program code that stores comprises computer readable program code that stores a set of patterns for interior design surface treatments, each pattern including a plurality of pattern attributes.

101. A computer program product according to claim 100 further comprising:
   computer readable program code that accepts at least one user selected attribute for at least one of the surface treatment product types to define the user search criteria; and
   computer readable program code that searches the stored pattern attributes for the at least one of the surface treatment product types to generate at least one of the plurality of arrays of patterns that meet the user search criteria.

102. A computer program product according to claim 101 wherein the computer readable program code that generates a plurality of arrays further comprises computer readable program code that generates for each pattern, an indicator of an extent that the pattern matches the user search criteria.

103. A computer program product according to claim 98 further comprising:
   computer readable program code that annotates the storyboard of interior design surface treatments for the interior space in response to user input.

104. A computer program product according to claim 98 further comprising:
   computer readable program code that emails the storyboard of interior design surface treatments for the interior space.

105. A computer program product according to claim 98 further comprising:
   computer readable program code that electronically orders samples of the interior design surface treatments that are contained in the storyboard.

106. A computer program product according to claim 98 further comprising:
   computer readable program code that electronically orders sufficient quantities of the interior design surface treatments that are contained in the storyboard for the interior space.

107. A computer program product that executes on a server that is connected to a client over a network, for generating a storyboard of interior design surface treatments for an interior space, the computer program product comprising a computer usable storage medium having computer readable program code embodied in the medium, the computer readable program code comprising:
   computer readable program code that stores a set of patterns for a plurality of surface treatment product types, each pattern including a plurality of pattern attributes;
   computer readable program code that accepts from the client over the network at least one user selected attribute for at least one of the surface treatment product types;
   computer readable program code that searches the stored pattern attributes for the at least one of the surface treatment product types to generate a plurality of arrays of patterns that meet the at least one user selected attribute;
   computer readable program code that transmits the plurality of arrays of patterns that meet the at least one user selected attribute to the client over the network;
   computer readable program code that receives from the client over the network a storyboard of interior design surface treatments for an interior space that represents at least one pattern from at least two of the arrays of patterns; and
   computer readable program code that stores the received storyboard.

108. A computer program product according to claim 107 wherein the computer readable program code that searches further comprises computer readable program code that generates for each pattern, an indicator of an extent that the pattern matches the user search criteria.

109. A computer program product that executes on a client that is connected to a server over a network, for generating a storyboard of interior design surface treatments for an interior space, the computer program product comprising a computer usable storage medium having computer readable program code embodied in the medium, the computer readable program code comprising:
   computer readable program code that accepts at least one user selected attribute for at least one of a plurality of surface treatment product types to define a user search criteria;
   computer readable program code that transmits the user search criteria to the server over the network;
   computer readable program code that receives from the server over the network, a plurality of arrays of patterns that correspond to the user search criteria, each array of patterns corresponding to a surface treatment product type;
   computer readable program code that displays the plurality of arrays of patterns;
   computer readable program code that accepts at least one user selection from at least one of the plurality of arrays of patterns;
   computer readable program code that generates a plurality of subarrays of patterns, each subarray corresponding to a surface treatment product type, in response to the at least one user selection from the corresponding array of patterns for the corresponding surface treatment type;
   computer readable program code that displays the plurality of subarrays of patterns;
   computer readable program code that combines at least one pattern from at least two of the subarrays of patterns to produce a storyboard of interior design surface treatments for an interior space; and
   computer readable program code that displays the storyboard of interior design surface treatments for the interior space.

110. A computer program product according to claim 109 wherein the computer readable program code that displays the plurality of arrays of patterns further comprises computer readable program code that displays with each pattern an indicator of an extent that the pattern matches the user search criteria.

111. A computer program product according to claim 109 further comprises:
   computer readable program code that annotates the storyboard of interior design surface treatments for the interior space in response to user input.

112. A computer program product according to claim 109 further comprising:
   computer readable program code that emails the storyboard of interior design surface treatments for the interior space.

113. A computer program product according to claim 109 further comprising:
   computer readable program code that electronically orders samples of the interior design surface treatments that are contained in the storyboard.

114. A computer program product according to claim 109 further comprising:

computer readable program code that electronically orders sufficient quantities of the interior design surface treatments that are contained in the storyboard for the interior space.

115. A computer program product according to claim 114 wherein the computer readable program code displays the plurality of arrays of patterns in a first window on a display and wherein the computer readable program code displays the plurality of subarrays of patterns in a second window on the display.

116. A computer program product according to claim 115 wherein the computer readable program code displays the storyboard in a third window on the display.

117. A system for generating a storyboard of interior design surface treatments for an interior space, comprising:

a computer display that displays a plurality of arrays of patterns that correspond to user search criteria, from a stored set of patterns for interior design surface treatments, each array of patterns corresponding to a surface treatment product type;

a computer that generates a plurality of subarrays of patterns, each subarray corresponding to a surface treatment product type, in response to user selection from the corresponding array of patterns for the corresponding surface treatment type, and that combines at least one pattern from at least two of the subarrays of patterns to produce a storyboard of interior design surface treatments for an interior space.

118. A system for generating a storyboard of interior design surface. treatments for an interior space, comprising:

a computer display that displays a plurality of arrays of patterns that correspond to user search criteria, from a stored set of patterns for interior design surface treatments, each array of patterns corresponding to a surface treatment product type; and a computer that combines at least one pattern from at least two of the arrays of patterns to produce a storyboard of interior design surface treatments for an interior space.

119. A system for generating a storyboard of interior design surface treatments for an interior space, comprising:

a computer display that displays in a first window on a display, a plurality of arrays of patterns that correspond to user search criteria, from a stored set of patterns for interior design surface treatments, each array of patterns corresponding to a surface treatment product type;

the computer display also displaying in a second window on the display a plurality of subarrays of patterns, each subarray corresponding to a surface treatment product type, in response to user selection from the corresponding array of patterns for the corresponding surface treatment type that is displayed in the first window; and the computer display also displaying in a third window on the display, at least one pattern from at least two of the subarrays of patterns in the second window, to produce a storyboard of interior design surface treatments for an interior space.

120. A system for generating a storyboard of interior design surface treatments for an interior space, comprising:

a computer that generates a plurality of arrays of patterns that correspond to user search criteria, from a stored set of patterns for interior design surface treatments, each array of patterns corresponding to a surface treatment product type;

the computer also generating a plurality of subarrays of patterns, each subarray corresponding to a surface treatment product type, in response to user selection from the corresponding array of patterns for the corresponding surface treatment type; and the computer also combining at least one pattern from at least two of the subarrays of patterns to produce a storyboard of interior design surface treatments for an interior space.

121. A server that generates a storyboard of interior design surface treatments for an interior space, comprising:

a server computer that stores a set of patterns for a plurality of surface treatment product types, each pattern including a plurality of pattern attributes;

the server computer also accepting from a client over a network at least one user selected attribute for at least one of the surface treatment product types;

the server computer also searching the stored pattern attributes for the at least one of the surface treatment product types to generate a plurality of arrays of patterns that meet the at least one user selected attribute;

the server computer also transmitting the plurality of arrays of patterns that meet the at least one user selected attribute to the client over the network;

the server computer also receiving from the client over the network a storyboard of interior design surface treatments for an interior space that represents at least one pattern from at least two of the arrays of patterns; and the server computer also storing the received storyboard.

122. A client that generates a storyboard of interior design surface treatments for an interior space, comprising:

a client computer that accepts at least one user selected attribute for at least one of a plurality of surface treatment product types to define a user search criteria;

the client computer also transmitting the user search criteria to a server over a network;

the client computer also receiving from the server over the network, a plurality of arrays of patterns that correspond to the user search criteria, each array of patterns corresponding to a surface treatment product type;

the client computer also displaying the plurality of arrays of patterns;

the client computer also accepting at least one user selection from at least one of the plurality of arrays of patterns;

the client computer also generating a plurality of subarrays of patterns, each subarray corresponding to a surface treatment product type, in response to the at least one user selection from the corresponding array of patterns for the corresponding surface treatment type;

the client computer also displaying the plurality of subarrays of patterns;

the client computer also combining at least one pattern from at least two of the subarrays of patterns to produce a storyboard of interior design surface treatments for an interior space; and the client computer also displaying the storyboard of interior design surface treatments for the interior space.

\* \* \* \* \*